United States Patent
Elshafie et al.

(10) Patent No.: US 12,507,065 B2
(45) Date of Patent: Dec. 23, 2025

(54) PRECONFIGURED REFERENCE SIGNAL RESOURCES FOR SECRET KEY EXTRACTION

(71) Applicant: QUALCOMM Incorporated, San Diego, CA (US)

(72) Inventors: Ahmed Elshafie, San Diego, CA (US); Alexandros Manolakos, Escondido, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 464 days.

(21) Appl. No.: 18/150,709

(22) Filed: Jan. 5, 2023

(65) Prior Publication Data

US 2024/0236662 A1  Jul. 11, 2024

(51) Int. Cl.
*H04W 12/041* (2021.01)
*H04W 28/26* (2009.01)
*H04W 72/02* (2009.01)
*H04W 72/563* (2023.01)
*H04W 76/14* (2018.01)
*H04W 56/00* (2009.01)

(52) U.S. Cl.
CPC ......... *H04W 12/041* (2021.01); *H04W 28/26* (2013.01); *H04W 72/02* (2013.01); *H04W 72/563* (2023.01); *H04W 76/14* (2018.02); *H04W 56/002* (2013.01)

(58) Field of Classification Search
CPC .................................................. H04W 4/30–80
See application file for complete search history.

(56) References Cited

U.S. PATENT DOCUMENTS

| | | | | |
|---|---|---|---|---|
| 10,630,646 | B2* | 4/2020 | Bone | H04L 63/029 |
| 2017/0055152 | A1* | 2/2017 | Zhang | H04L 63/0876 |
| 2017/0078875 | A1* | 3/2017 | Muhanna | H04L 9/0827 |
| 2021/0337381 | A1* | 10/2021 | Paladugu | H04W 12/71 |
| 2022/0272532 | A1* | 8/2022 | Kim | H04W 60/00 |
| 2022/0278835 | A1* | 9/2022 | Guo | H04W 12/041 |
| 2022/0312196 | A1* | 9/2022 | Guo | H04W 12/037 |
| 2023/0254692 | A1* | 8/2023 | Kim | H04W 76/14 |
| | | | | 726/6 |

\* cited by examiner

*Primary Examiner* — San Htun
(74) *Attorney, Agent, or Firm* — Holland & Hart LLP/Qualcomm

(57) ABSTRACT

Methods, systems, and devices for preconfigured reference signal resources for secret key extraction are described. In some examples, a user equipment (UE) may identify a set of resources reserved for a secret key derivation process including an exchange of reference signals between the UE and a first wireless device using the set of resources. As such, the UE may transmit a first reference signal to the first wireless device using the set of resources and may receive a second reference signal from the first wireless device in accordance with the secret key derivation process. The UE may estimate a communications channel between the UE and the first wireless device and may determine the secret key based on the communications channel in accordance with the secret key derivation process. Accordingly, the UE may communicate with a selected wireless device over the communications channel using wireless communications secured using the secret key.

21 Claims, 18 Drawing Sheets

PRECONFIGURED REFERENCE SIGNAL RESOURCES FOR SECRET KEY EXTRACTION

FIELD OF TECHNOLOGY

The following relates to wireless communications, including preconfigured reference signal resources for secret key extraction.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may use secure communications. For example, a UE and a wireless device may communicate information to one another, where the information may be intended for exclusive use at the wireless device and the UE.

SUMMARY

The described techniques relate to improved methods, systems, devices, and apparatuses that support preconfigured reference signal resources for secret key extraction. Generally, the described techniques provide for a user equipment (UE) identifying a set of resources reserved for a secret key derivation process. As such, the UE may transmit a first reference signal to a first wireless device using the set of resources and the UE may receive a second reference signal from the first wireless device in accordance with the secret key derivation process. In some examples, the UE may estimate a communications channel between the UE and the first wireless device based on the second reference signal and the UE may determine the secret key based on the communications channel. In such examples, the UE may engage in secure communications with a selected wireless device (e.g., the first wireless device or another wireless device) using the secret key.

A method for wireless communications at a UE is described. The method may include identifying, while the UE is in an idle state with respect to communications with a first wireless device, a set of resources that is reserved for a secret key derivation process that includes an exchange of reference signals between the UE and the first wireless device using the set of resources, transmitting a first reference signal to the first wireless device using the set of resources in accordance with the secret key derivation process, receiving a second reference signal from the first wireless device in accordance with the secret key derivation process, estimating a communications channel between the UE and the first wireless device based on the second reference signal and in accordance with the secret key derivation process, determining the secret key based on the communications channel estimated by the UE in accordance with the secret key derivation process, and communicating with a selected wireless device over the communications channel using wireless communications that are secured using the secret key.

An apparatus for wireless communications at a UE is described. The apparatus may include a processor, memory coupled with the processor, and instructions stored in the memory. The instructions may be executable by the processor to cause the apparatus to identify, while the UE is in an idle state with respect to communications with a first wireless device, a set of resources that is reserved for a secret key derivation process that includes an exchange of reference signals between the UE and the first wireless device using the set of resources, transmit a first reference signal to the first wireless device using the set of resources in accordance with the secret key derivation process, receive a second reference signal from the first wireless device in accordance with the secret key derivation process, estimate a communications channel between the UE and the first wireless device based on the second reference signal and in accordance with the secret key derivation process, determine the secret key based on the communications channel estimated by the UE in accordance with the secret key derivation process, and communicate with a selected wireless device over the communications channel using wireless communications that are secured using the secret key.

Another apparatus for wireless communications at a UE is described. The apparatus may include means for identifying, while the UE is in an idle state with respect to communications with a first wireless device, a set of resources that is reserved for a secret key derivation process that includes an exchange of reference signals between the UE and the first wireless device using the set of resources, means for transmitting a first reference signal to the first wireless device using the set of resources in accordance with the secret key derivation process, means for receiving a second reference signal from the first wireless device in accordance with the secret key derivation process, means for estimating a communications channel between the UE and the first wireless device based on the second reference signal and in accordance with the secret key derivation process, means for determining the secret key based on the communications channel estimated by the UE in accordance with the secret key derivation process, and means for communicating with a selected wireless device over the communications channel using wireless communications that are secured using the secret key.

A non-transitory computer-readable medium storing code for wireless communications at a UE is described. The code may include instructions executable by a processor to identify, while the UE is in an idle state with respect to communications with a first wireless device, a set of resources that is reserved for a secret key derivation process that includes an exchange of reference signals between the UE and the first wireless device using the set of resources, transmit a first reference signal to the first wireless device using the set of resources in accordance with the secret key derivation process, receive a second reference signal from the first wireless device in accordance with the secret key derivation process, estimate a communications channel between the UE and the first wireless device based on the second reference signal and in accordance with the secret key derivation process, determine the secret key based on the communications channel estimated by the UE in accordance with the secret key derivation process, and communicate with a selected wireless device over the communications channel using wireless communications that are secured using the secret key.

In some examples of the method, apparatuses, and non-transitory computer-readable medium described herein, identifying the set of resources may include operations, features, means, or instructions for identifying the set of resources as a periodic set of resources available for use by a set of multiple wireless devices that includes the UE.

In some examples of the method, apparatuses, and non-transitory computer-readable medium described herein, identifying the set of resources may include operations, features, means, or instructions for identifying the set of resources as individual wideband sidelink reference signal resources per sidelink resource pool, where the UE may be a first sidelink device and the first wireless device may be a second sidelink device that may be one of a relay UE, a primary UE, or a programmable logic controller (PLC) UE.

In some examples of the method, apparatuses, and non-transitory computer-readable medium described herein, identifying the set of resources may include operations, features, means, or instructions for reserving the set of resources during one or more sidelink channel reservation occasions, where the one or more sidelink channel reservation occasions may be available for a set of multiple wireless devices to compete for access to the set of resources.

Some examples of the method, apparatuses, and non-transitory computer-readable medium described herein may further include operations, features, means, or instructions for obtaining access to the one or more channel reservation occasions, where obtaining access to the one or more channel reservation occasions may be based on a data priority, data security requirements, or both, associated with the UE.

In some examples of the method, apparatuses, and non-transitory computer-readable medium described herein, identifying the set of resources may include operations, features, means, or instructions for selecting the set of resources based on a synchronization signal block (SSB) index used by the UE to communicate with a base station.

In some examples of the method, apparatuses, and non-transitory computer-readable medium described herein, the first reference signal may be quasi co-located with an SSB associated with the SSB index.

In some examples of the method, apparatuses, and non-transitory computer-readable medium described herein, identifying the set of resources may include operations, features, means, or instructions for selecting the set of resources based on a random access occasion and preamble index used by the UE to communicate with a base station.

In some examples of the method, apparatuses, and non-transitory computer-readable medium described herein, identifying the set of resources may include operations, features, means, or instructions for receiving an index of the set of resources from a base station, where the index may be included in at least one of a master information block (MIB), a system information block (SIB), an other SIB (OSIB), or a downlink random access channel (RACH) message.

In some examples of the method, apparatuses, and non-transitory computer-readable medium described herein, identifying the set of resources may include operations, features, means, or instructions for receiving an index of the set of resources, where the index may be included in a physical broadcast channel (PBCH).

In some examples of the method, apparatuses, and non-transitory computer-readable medium described herein, identifying the set of resources may include operations, features, means, or instructions for receiving a configuration of the set of resources from a base station, where the configuration may be indicated in at least one of a MIB, an SIB, an OSIB, or a downlink RACH message.

In some examples of the method, apparatuses, and non-transitory computer-readable medium described herein, identifying the set of resources may include operations, features, means, or instructions for receiving, via a MIB, a configuration of the set of resources such that the wireless communications that may be secured using the secret key include receipt of an SIB and exchange of one or more RACH messages.

In some examples of the method, apparatuses, and non-transitory computer-readable medium described herein, identifying the set of resources may include operations, features, means, or instructions for receiving, via an SIB, a configuration of the set of resources such that the wireless communications that may be secured using the secret key include exchange of one or more RACH messages.

In some examples of the method, apparatuses, and non-transitory computer-readable medium described herein, identifying the set of resources may include operations, features, means, or instructions for receiving, via an OSIB, a configuration of the set of resources such that the wireless communications that may be secured using the secret key include exchange of one or more RACH messages.

In some examples of the method, apparatuses, and non-transitory computer-readable medium described herein, identifying the set of resources may include operations, features, means, or instructions for receiving, via a downlink RACH message, a configuration of the set of resources such that the wireless communications that may be secured using the secret key include receipt exchange of additional RACH messages subsequent to the downlink RACH message.

In some examples of the method, apparatuses, and non-transitory computer-readable medium described herein, the first reference signal may be a sounding reference signal (SRS) or a sidelink reference signal (SL-RS) while the second reference signal may be a channel state information reference signal (CSI-RS) or SL-RS.

In some examples of the method, apparatuses, and non-transitory computer-readable medium described herein, the selected wireless device may be either the first wireless device or another wireless device.

A method for wireless communications at a base station is described. The method may include identifying a set of resources that is reserved for a secret key derivation process between a UE and another wireless device, where the secret key derivation process includes an exchange of reference signals between the UE and the other wireless device using the set of resources and transmitting an indication of the set of resources to the UE.

An apparatus for wireless communications at a base station is described. The apparatus may include a processor, memory coupled with the processor, and instructions stored in the memory. The instructions may be executable by the processor to cause the apparatus to identify a set of resources that is reserved for a secret key derivation process between a UE and another wireless device, where the secret key derivation process includes an exchange of reference signals between the UE and the other wireless device using the set of resources and transmit an indication of the set of resources to the UE.

Another apparatus for wireless communications at a base station is described. The apparatus may include means for identifying a set of resources that is reserved for a secret key derivation process between a UE and another wireless device, where the secret key derivation process includes an exchange of reference signals between the UE and the other wireless device using the set of resources and means for transmitting an indication of the set of resources to the UE.

A non-transitory computer-readable medium storing code for wireless communications at a base station is described. The code may include instructions executable by a processor to identify a set of resources that is reserved for a secret key derivation process between a UE and another wireless device, where the secret key derivation process includes an exchange of reference signals between the UE and the other wireless device using the set of resources and transmit an indication of the set of resources to the UE.

In some examples of the method, apparatuses, and non-transitory computer-readable medium described herein, transmitting the indication of the set of resources to the UE may include operations, features, means, or instructions for transmitting an index of the set of resources, where the index may be included in at least one of a MIB, an SIB, an OSIB, or a downlink RACH message.

In some examples of the method, apparatuses, and non-transitory computer-readable medium described herein, transmitting the indication of the set of resources to the UE may include operations, features, means, or instructions for transmitting an index of the set of resources, where the index may be included in a PBCH.

In some examples of the method, apparatuses, and non-transitory computer-readable medium described herein, transmitting the indication of the set of resources to the UE may include operations, features, means, or instructions for transmitting a configuration of the set of resources, where the configuration may be indicated in at least one of a MIB, an SIB, OSIB, or a downlink RACH message.

In some examples of the method, apparatuses, and non-transitory computer-readable medium described herein, transmitting the indication of the set of resources to the UE may include operations, features, means, or instructions for transmitting, via a MIB, a configuration of the set of resources such that the wireless communications that may be secured using the secret key include receipt of an SIB and exchange of one or more RACH messages.

In some examples of the method, apparatuses, and non-transitory computer-readable medium described herein, transmitting the indication of the set of resources to the UE may include operations, features, means, or instructions for transmitting, via an SIB, a configuration of the set of resources such that the wireless communications that may be secured using the secret key include exchange of one or more RACH messages.

In some examples of the method, apparatuses, and non-transitory computer-readable medium described herein, transmitting the indication of the set of resources to the UE may include operations, features, means, or instructions for transmitting, via an OSIB, a configuration of the set of resources such that the wireless communications that may be secured using the secret key include exchange of one or more RACH messages.

In some examples of the method, apparatuses, and non-transitory computer-readable medium described herein, identifying the set of resources may include operations, features, means, or instructions for transmitting, via a downlink RACH message, a configuration of the set of resources such that the wireless communications that may be secured using the secret key include receipt exchange of additional RACH messages subsequent to the downlink RACH message.

DETAILED DESCRIPTION

In some cases, secure communications may be important in wireless communications systems. For example, a user equipment (UE) and a wireless device (e.g., a base station, a sidelink device) may communicate information to one another, where the information may be intended for exclusive use at the wireless device and the UE. In such examples, the UE and the wireless device may use secure communications such that other wireless devices may be unable to eavesdrop or otherwise coherently decode the information communicated between the UE and the wireless device.

In some examples, devices may support preconfigured reference signal resources for secret key extraction. For example, wireless devices may have a set of resources for reference signals used for secret key extraction based on channel randomness. In some examples, the reference signal resources may occur periodically on occasions known to one or more UEs. In sidelink implementations, the reference signal resources may be configured resource pools for wideband sidelink reference signal (SL-RS) resources. In some cases, the resources may be parameterized based on other commonly used reference signal resources. For example, a wireless device may parameterize the set of resources on a per UE basis, for example, using a synchronization signal block (SSB) index selected by a UE. In some other examples, the set of resources may be parameterized based on a combination of a random access channel (RACH) occasion and a preamble index selected for a corresponding preamble transmission. For example, a UE may perform a random access procedure with a wireless device, where the UE may transmit a preamble with a preamble index during a RACH occasion. The UE may determine the set of resources based at least in part on the RACH occasion and the preamble index.

In some examples, a wireless device may signal an index of one or more reference signal resources for secret key extraction. In other words, the wireless device may transmit an index to the UE, the index corresponding to one or more reference signal resources that the UE, the wireless device, another UE, or a combination thereof, may use for secret key extraction. In some examples, as an alternative to reference signal resources being loaded to (e.g., preconfigured at) UEs, the wireless device may signal a configuration of one or more reference signal resources to UEs.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to preconfigured reference signal resources for secret key extraction.

Figure 1:
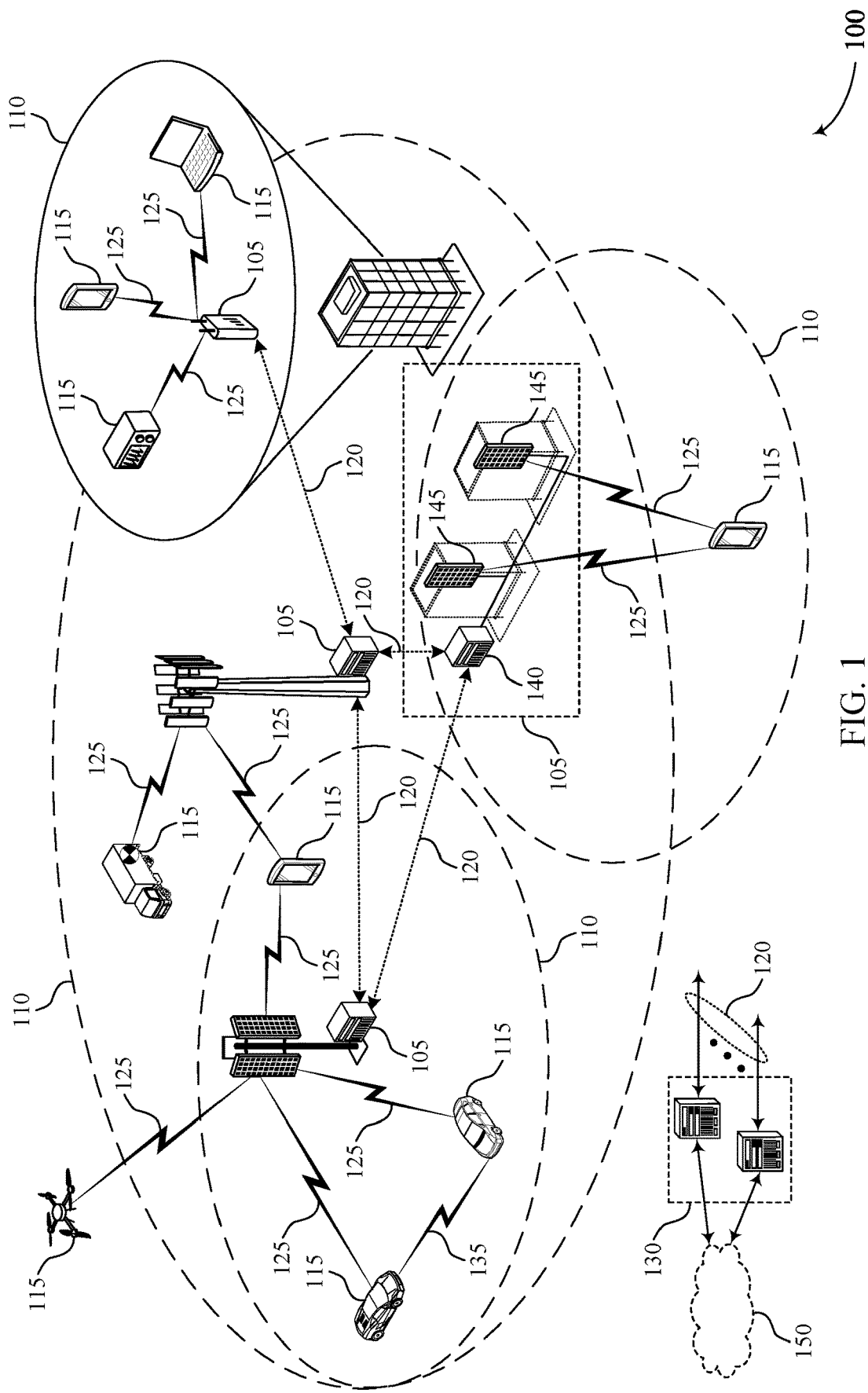
FIGS. 1 and 2 illustrate examples of wireless communications systems that support preconfigured reference signal resources for secret key extraction in accordance with aspects of the present disclosure.

FIG. 1 illustrates an example of a wireless communications system 100 that supports preconfigured reference signal resources for secret key extraction in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IOT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, devices may support preconfigured reference signal resources for secret key extraction. For example, wireless devices may have a set of resources (e.g., loaded to UEs 115) for reference signals used for secret key extraction based on channel randomness. In some examples, the reference signal resources may occur periodically on occasions known to one or more UEs 115. In sidelink implementations, the reference signal resources may be configured resource pools for wideband SL-RS resources. For example UEs 115 configured with the reference signal resources may use the resources to share a secret key with a relay UE 115, a primary UE 115, or a PLC UE 115. In some cases, the resources may be parameterized based on other commonly used reference signal resources. For example, a wireless device may parameterize the set of resources on a per UE 115 basis, for example, using an SSB index selected by a UE 115. In some other examples, the set of resources may be parameterized based on a combination of a RACH occasion and a preamble index selected for a corresponding preamble transmission. For example, a UE 115 may perform a random access procedure with a wireless device, where the UE 115 may transmit a preamble with a preamble index during a RACH occasion. The UE 115 may determine the set of resources based at least in part on the RACH occasion and the preamble index.

In some examples, a wireless device may signal an index of one or more reference signal resources for secret key extraction. In other words, the wireless device may transmit an index to the UE 115, the index corresponding to one or more reference signal resources that the UE 115, the wireless device, another UE 115, or a combination thereof, may use for secret key extraction. In some examples, as an alternative to reference signal resources being loaded to (e.g., preconfigured at) UEs 115, the wireless device may signal a configuration of one or more reference signal resources to UEs 115.

Figure 2:
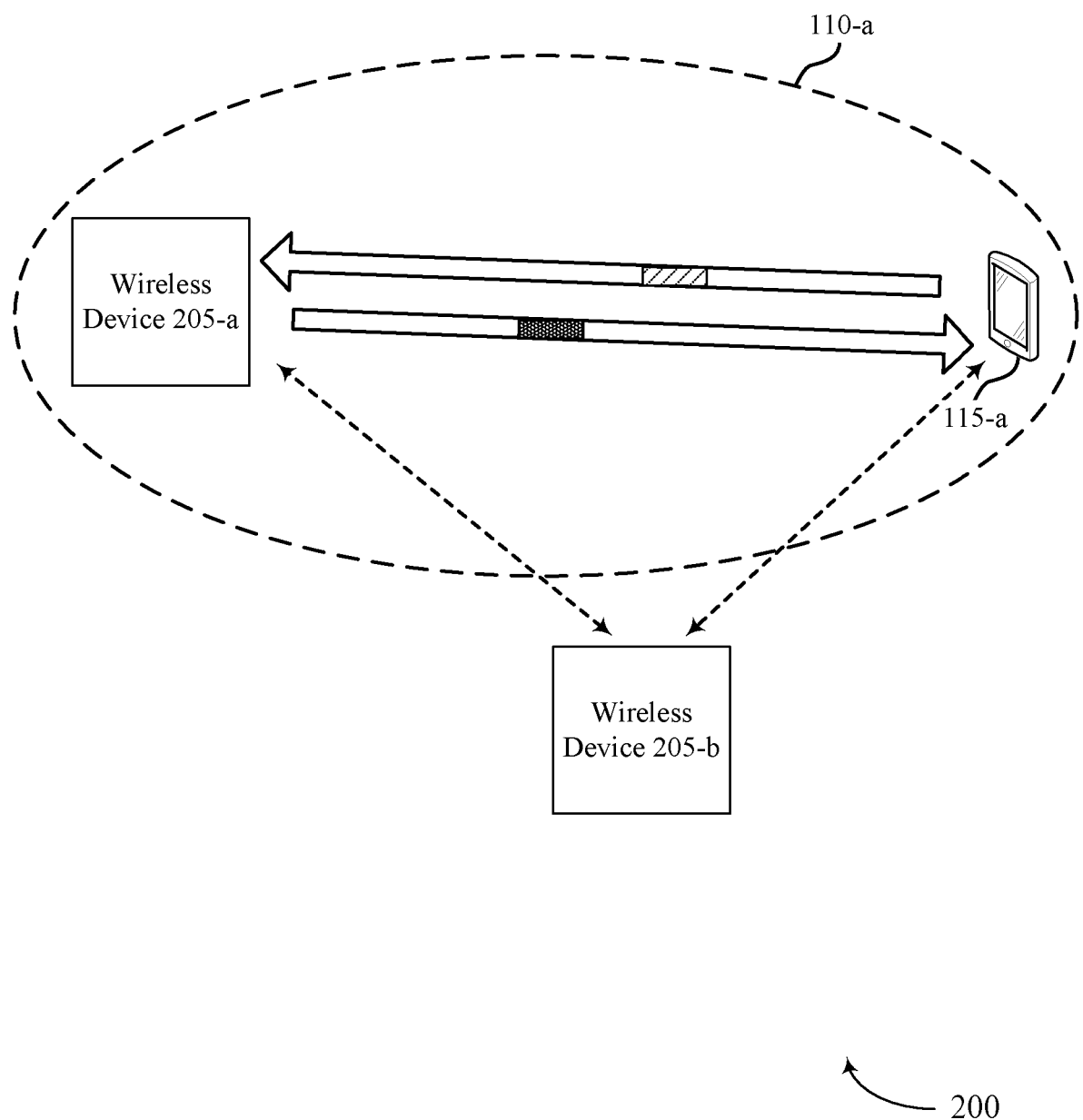

FIG. 2 illustrates an example of a wireless communications system 200 that supports preconfigured reference signal resources for secret key extraction in accordance with aspects of the present disclosure. The wireless communications system 200 may implement or be implemented by aspects of the wireless communications system 100. For example, the wireless communications system 200 may include a UE 115-a, a wireless device 205-a, and a wireless device 205-b, which may be examples of corresponding devices described with reference to FIG. 1. For example, the wireless device 205-a and the wireless device 205-b may be examples of UEs 115, base stations, sidelink enabled devices, or other wireless devices. The wireless device 205-a may communicate with the UE 115 in a geographic coverage area 110-a, which may be an example of a geographic coverage area 110 described with reference to FIG. 1. The wireless device 205-a and the UE 115-a may communicate using secure communications, for example, encoding and decoding communications using a secret key in accordance with one or more secret key reference signal resources.

In some cases, secure communications may be important in wireless communications systems. For example, the UE 115-a and the wireless device 205-a may communicate information to one another, where the information may be intended for exclusive use at the wireless device 205-a, the UE 115-a, or both. In such examples, the UE 115-a and the wireless device 205-a may use secure communications such that wireless device 205-b may be unable to eavesdrop or otherwise coherently decode the information communicated between the UE 115-a and the wireless device 205-a. In some wireless communications systems, such as in IoT implementations, communication security may be more crucial as several devices may be connected with one another. That is, devices communicating in wireless communications systems where multiple devices are connected to one another may use secure communications such that other devices (e.g., in an IoT implementation or outside the IoT implementation) may be unable to eavesdrop.

In some cases, devices may communicate, or otherwise operate, according to a power level where adding more security (e.g., with an addition of secure bits obtained from channels and sounding reference signals (SRSs)) between devices communicating with secure communications may be beneficial. For example, UE 115-a may be a low power device, or may operate in a low power mode, and may communicate with the wireless device 205-a using secure communications. In such examples, adding secure bits to signaling (e.g., CSI-RSs, SRSs) associated with securing such communications may enhance the security of the information signaled between the UE 115-a and the wireless device 205-a.

In some cases, devices may be configured to secure specific communication layers. For example, some wireless communications systems may implement a physical layer (e.g., layer 1 (L1)) security. In some examples, wireless communications systems may secure upper layers (e.g., L2, L3). As an illustrative example, the may secure communication layers using or otherwise referencing Table 1.

TABLE 1

|  | IDLE/INACTIVE | TRANSITION | CONNECTED |
| --- | --- | --- | --- |
| L3 RRC | System Information, Paging | CCCH | DCCH |
| L3 UP data | N/A | N/A | DTCH |
| L2 control | N/A | MAC CE | MAC CEs, Control PDU |
| L2 header | N/A | MAC | PDCP/RLC/MAC |
| L1 PHY | DCI of SI, Paging | DCI for the initial access | DCI, PUCCH |

Although shown with specific channels and signals, Table 1 may include alternative or additional channels and signals for each layer (e.g., L1, L2, L3) and state (e.g., idle, inactive, transition, connected). In the example of Table 1, devices communicating in a connected state may communicate with secure communications, where one or more upper layers are protected (e.g., secured). For example, the UE 115-a and the wireless device 205-a may communicate with protected L3 signaling. That is, the wireless device 205-a may transmit L3 RRC signaling to the UE 115-a using a secured dedicated control channel (DCCH) and the UE 115-a may transmit L3 uplink data to the wireless device 205-a using a secured dedicated traffic channel (DTCH). Additionally, in the example of Table 1, devices communicating in the connected state may communicate with secure communications where one or more layers are unprotected (e.g., L1, L2). For example, the UE 115-a and the wireless device 205-a may communicate with unprotected L1 and L2 signaling. That is, the wireless device 205-a and the UE 115-a may communicate using unprotected medium access control (MAC) (e.g., MAC control elements (CEs)), control protocol data units (PDUs), packet data convergence protocol (PDCP), radio link control (RLC), downlink control informations (DCIs), physical uplink control channel (PUCCH), among other channels and signals associated with L1 and L2. In some examples, devices in other states such as devices in transition mode (e.g., during a handover) or idle mode may communicate with unsecure communications. For example, the UE 115-a and the wireless device 205-a may communicate with unprotected system information, system information DCIs, paging, common control channel (CCCH), MAC (e.g., MAC CEs), DCI for initial access, among other channels and signals associated with transition or idle states.

In some examples, devices may be configured (e.g., preconfigured) to use reference signal resources for secret key extraction. That is, devices may be configured to use specific reference signal resources to perform secret key extraction, where the devices may use the secret key to secure communications. Configuring devices to use specific secret key extraction reference signal resources may be particularly beneficial in one or more scenarios, for example, in initial access channel security and sidelink security (e.g., as devices may be out-of-coverage or located away from geographic coverage area 110-a). In some examples, supporting physical layer security and providing secret key sharing may enable a pair of devices (e.g., UEs 115) attempt to extract a secret key from a channel (e.g., a communication channel between the pair of devices) and use the secret key to secure some unsecured channels (e.g., PUCCH, DCI) and further improve security of other channels (e.g., physical downlink shared channel (PDSCH), physical uplink shared channel (PUSCH)) from a physical layer security perspective. In other words, improving secret key extraction procedures and communication security may support more robust channel encryption.

Some wireless communications systems may be configured to use a type-A secret key extraction methods (e.g., secret key extraction from channel randomness). In type-A secret key extraction methods, two devices, such as the wireless device 205-a and the UE 115-a, may transmit reference signals to each other. In such examples, each device may estimate a channel associated with a received reference signal. For example, the wireless device 205-a may transmit a second reference signal 215 (e.g., a CSI-RS, an SL-RS) to the UE 115-a on a channel (e.g., a Uu channel, a sidelink channel) and the UE 115-a may receive the second reference signal 215, where the UE 115-a may perform measurements on the second reference signal 215 to estimate the channel. Further, each device may obtain a metric based on estimating the channel (e.g., a channel power, a reference signal received power (RSRP), a signal to interference plus noise ratio (SINR), a phase). Phrased alternatively, each device may be able to obtain a channel metric based on performing measurements on a received reference signal. For example, the UE 115-a may perform an RSRP measurement on the second reference signal 215 from the wireless device 205-a. In some examples, each device may quantize the obtained channel metric value(s) or each device may use the obtained channel metric as an input to a key derivation function (KDF) (i.e., hash message authentication code (HMAC)-secure hash algorithm (SHA)-256, producing a secret key and one or more other parameters). As such, a secret key may be obtained at both sides (e.g., by both devices), where in relatively high signal to noise ratio (SNR) scenarios, the secret key may be substantially secured. Otherwise, the two devices may transmit a repetition of one or more pilot signals or perform some key refinement procedure to further secure the secret key. For example, in relatively low SNR scenarios, the wireless device 205-a and the UE 115-a may transmit one or more reference signals to one another for key refinement procedures (e.g., applying measurements or metrics to some KDF). In some examples, the secret key may be used by both devices to secure transmissions, secure one or more fields within a physical layer channel (e.g., some information in physical downlink control channel (PDCCH), PUCCH, PDSCH, PUSCH), among other communications to be secured.

Some wireless communications systems may be configured to use a type-B secret key extraction methods. For example, in type-B secret key extraction methods, the UE 115-a may send SRSs (e.g., the first reference signal 210) to the wireless device 205-a for the wireless device 205-a to estimate the channel between the UE 115-a and the wireless device 205-a. Using the estimated channel, the wireless device 205-a may set a received signal at the UE 115-a resource elements to be equal to a specific value. That is, the wireless device 205-a may transmit the second reference signal 215 to the UE 115-a including the specific value in one or more resource elements for the UE 115-a. The wireless device 205-a may set the specific value to a level to deliver a secret key value to the UE 115-a. In other words, the wireless device 205-a may transmit the second reference signal 215 to the UE 115-a, including a specific value that the UE 115-a may use to generate, or otherwise obtain, the secret key. As such, a secret key may be obtained at both sides (e.g., by both devices), where in relatively high SNR scenarios, the secret key may be substantially secured. Otherwise, the two devices may transmit a repetition of one or more pilot signals or perform some key refinement procedure to further secure the secret key. For example, in relatively low SNR scenarios, the wireless device 205-a and the UE 115-a may transmit one or more reference signals to one another for key refinement procedures (e.g., applying measurements or metrics to some KDF). In some examples, the secret key may be used by both devices to secure transmissions, secure one or more fields within a physical layer channel (e.g., some information in PDCCH, PUCCH, PDSCH, PUSCH), among other communications to be secured. Type-B secret key extraction supports setting the secret key at a receiving node (e.g., the UE 115-a) that the wireless device 205-a determines, unlike type-A secret key extraction which may be a result of a channel outcome or mutual estimation. As such, using type-B secret key extraction allows wireless communications systems to transmit group common keys which may be used for group common DCI. For example, the wireless device 205-a may determine a secret key for more than one receiving node such that multiple devices may engage in secure communications.

In some examples, it may be desired to have configured (e.g., preconfigured) reference signals (e.g., SRS, CSI-RS, SL-RS) for extracting secret keys. For example, the wireless device 205-a and the UE 115-a may be configured to use SRS signaling and CSI-RS signaling for secret key extraction. In some examples, the resources associated with the reference signals may be used in initial access procedures where a pool of reference signal resources may be used to extract secret keys between the wireless device 205-a and the UE 115-a, for example, to secure RACH messages and one or more subsequent transmissions. For example, the UE 115-a may be configured with a reference signal resource pool such that the UE 115-a may transmit the first reference signal 210, using one or more resources of the resource pool, to the wireless device 205-a as part of a RACH procedure such that the UE 115-a may be able to secure subsequent RACH messages, payload messages, among other transmissions. In some wireless communication systems, such as in sidelink communications, some UEs 115 may be out-of-coverage (e.g., outside coverage area 110-a), such that having configured (e.g., loaded) SL-RS resources to extract secret keys may support quick secure communications, for example, for unsecured channels such as physical sidelink control channel (PSCCH), physical sidelink shared channel (PSSCH), physical sidelink feedback channel (PSFCH), among other sidelink channels.

In some examples, wireless communications systems may support preconfigured reference signal resources for secret key extraction. For example, wireless devices may have a set of configured (e.g., loaded to UEs 115) resources for reference signals where the resources may be used for secret key extraction based on channel randomness. In some examples, such reference signal resources may have the same waveform, parameterization, or a combination thereof, as SRS and CSI-RS resources. In some examples, the reference signal resources may occur periodically on occasions known to one or more UEs 115, much like resources for msgA PUSCH in a RACH procedure. For example, the reference signal resources may occur periodically on occasions known to UEs 115 in a wireless communications system.

In sidelink implementations, the reference signal resources may be configured resource pools for wideband SL-RS resources. For example, the reference signal resources may be configured similar to PSFCH resources such that UEs 115 configured with the reference signal resources may use the resources to share a secret key with a relay, primary UE, or PLC UE. In some examples, secret key sharing (e.g., agreement) may be completed by reserving the wideband SL-RS resources. For example, a UE 115 reserving a wideband SL-RS resource may agree on a secret key with a group of UEs 115 or one or more UEs 115 using a receiving resource pool associated with the wideband SL-RS resource. In some examples, there may be reservation occasions where UEs 115 may compete to obtain the reservation occasions and a UE 115 that wins one or more reservation occasions may own the SL-RS used for secret key extraction. For example, a UE 115 may compete with one or more other UEs 115 to obtain access to a sidelink channel during one or more channel reservation occasions (e.g., in a contention based channel access procedure such as listen before talk (LBT) or clear channel assessment (CCA)). In examples where the UE 115 obtains access to the sidelink channel during the one or more channel reservation occasions, the UE 115 may own the SL-RS used for secret key extraction and may have access to the wideband SL-RS resources associated with the secret key extraction. Additionally, the UE 115 may obtain access to the sidelink channel during the one or more channel reservation occasions as a function of a data priority, one or more data security requirements, among other factors associated with gaining access to a wireless channel.

For security and to allow different UEs 115 to use different reference signal (e.g., SRS, CSI-RS) resources, the wireless device 205-a may parameterize the set of resources to further improve commonly used reference signal (e.g., SRS, CSI-RS) resources for secret key extraction. For example, the wireless device 205-a may parameterize the set of resources on a per UE 115 basis, for example, using an SSB index selected by the UE 115-a. In such examples, the UE 115-a and the wireless device 205-a may use a transmit beam (e.g., a root beam) to communicate and the transmit beam may be associated with an SSB index, where the UE 115-a may be configured to use the set of resources, corresponding to the SSB index, for secret key extraction. In addition, in some examples, the reference signals may be quasi co-located (QCLed) with the transmit beam (e.g., the SSB index beam, the root beam). Parameterizing the set of resources (e.g., with SSB indices) may be valid in sidelink implementations, where UEs 115, after synchronizing with one another, may share secret keys using SL-RS resources corresponding to an SSB index selected by a receiving UE 115. For example, UE 115-a may synchronize with another UE 115, where the other UE 115 may select and indicate an SSB index for subsequent sidelink signaling with UE 115-a such that the UE 115-a and the other UE 115 may exchange SL-RSs for secret key extraction using a set of resources associated with the selected SSB index. In some examples, the set of resources may be parameterized based on a combination of a RACH occasion and a preamble index selected for a corresponding preamble transmission (e.g., similar to a msg-A PUSCH). For example, the UE 115-a may perform a random access procedure with the wireless device 205-a, where the UE 115-a may transmit, during a RACH occasion, at least a preamble with a preamble index. The UE 115-a may determine the set of resources based at least in part on the RACH occasion and the preamble index.

In some examples, alternative to using an SSB index to down select the reference signal resources used for secret key extraction, the wireless device 205-a may signal an index of one or more reference signal resources used for secret key extraction. In other words, the wireless device 205-a may transmit an index to the UE 115-a, the index corresponding to one or more reference signal resources that the UE 115-a, the wireless device 205-a, another UE 115, or a combination thereof, may use for secret key extraction. In some examples, the wireless device 205-a may signal the index in a master information block (MIB) (e.g., within a physical broadcast channel (PBCH)), a system information block 1 (SIB1), an other SIB (OSIB), a Msg2, or a Msg4, where the resources associated with the index may be used for secret key extraction based on channel randomness. In cases where the index is signaled in a MIB, the secret key may be used to secure subsequent transmissions such as SIB1 transmissions, Msg2 transmissions, Msg3 transmissions, Msg4 transmissions, as well as other subsequent transmissions. In cases where the index is signaled in a SIB1, the secret key may be used to secure subsequent transmissions such as Msg2 transmissions, Msg3 transmissions, Msg4 transmissions, as well as other subsequent transmissions. In cases where the index is signaled in an OSIB (e.g., a security SIB), the secret key may be used to secure subsequent transmissions such as Msg2 transmissions, Msg3 transmissions, Msg4 transmissions, as well as other subsequent transmissions. In cases where the index is signaled in a Msg2, the secret key may be used to secure subsequent transmissions such as Msg4 transmissions, as well as other subsequent transmissions. In sidelink implementations, reference signal indices may be signaled in PBCH. For example, the UE 115-a may signal an SL-RS resource index to another UE 115 to use to exchange SL-RSs as part of a secret key extraction process.

In some examples, alternative to reference signal resources being loaded to (e.g., preconfigured at) UEs 115, the wireless device 205-a may configure reference signal resources. For example, the wireless device 205-a may configure the UE 115-a with reference signal resources for secret key extraction, based on channel randomness, as or within a MIB (e.g., within a PBCH), a SIB1, an OSIB, a Msg2, or a Msg4. In cases where the configuration is signaled in a MIB, the secret key may be used to secure subsequent transmissions such as SIB1 transmissions, Msg2 transmissions, Msg3 transmissions, Msg4 transmissions, as well as other subsequent transmissions. In cases where the configuration is signaled in a SIB1, the secret key may be used to secure subsequent transmissions such as Msg2 transmissions, Msg3 transmissions, Msg4 transmissions, as well as other subsequent transmissions. In cases where the configuration is signaled in an OSIB (e.g., a security SIB), the secret key may be used to secure subsequent transmissions such as Msg2 transmissions, Msg3 transmissions, Msg4 transmissions, as well as other subsequent transmissions. In cases where the configuration is signaled in a Msg2, the secret key may be used to secure subsequent transmissions such as Msg4 transmissions, as well as other subsequent transmissions.

Configuring devices with resources to use for secret key extraction may enable devices to secure communications expeditiously. That is, defining and determining resource sets for secret key reference signal exchange may enable devices to identify reference signals on agreed upon resources, resulting in relatively quick secure communications.

Figure 3:
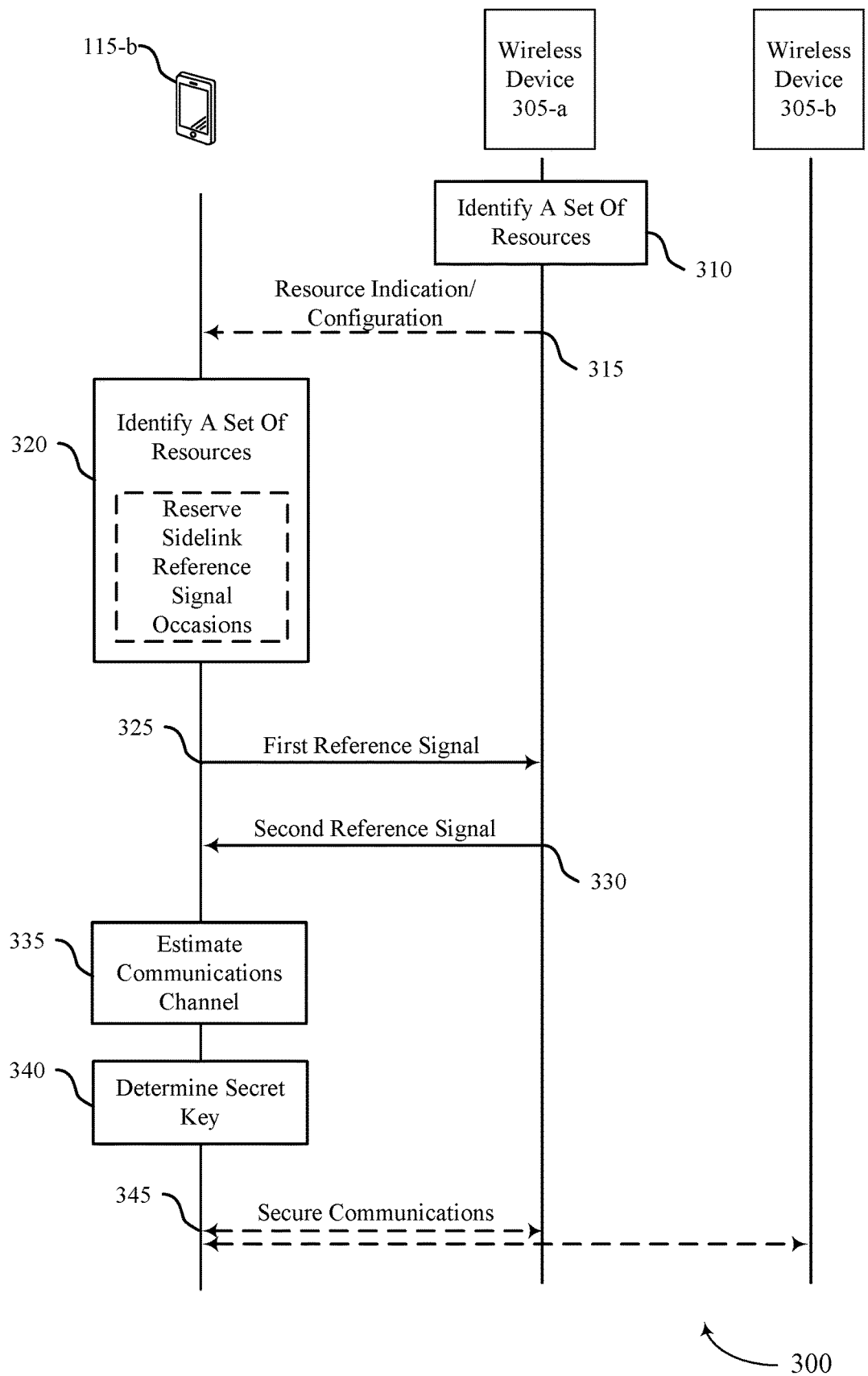
FIG. 3 illustrates an example of a process flow that supports preconfigured reference signal resources for secret key extraction in accordance with aspects of the present disclosure.

FIG. 3 illustrates an example of a process flow 300 that supports preconfigured reference signal resources for secret key extraction in accordance with aspects of the present disclosure. In some examples, the process flow 300 may implement aspects of wireless communications systems 100 or 200. For example, process flow 300 may include a UE 115-b a wireless device 305-a, and a wireless device 305-b, which may be examples of corresponding devices as described with reference to FIGS. 1 and 2. In some cases, one or more resources may be loaded to, or configured for, the UE 115-b, the wireless devices 305, or a combination thereof, where the one or more resources may be used for reference signal exchange as part of a secret key extraction process.

In the following description of the process flow 300, the operations may be performed (e.g., reported or provided) in a different order than the order shown, or the operations performed by the UE 115-b, the wireless device 305-a, and the wireless device 305-b may be performed in different orders or at different times. For example, specific operations also may be left out of the process flow 300, or other operations may be added to the process flow 300. Further, although some operations or signaling may be shown to occur at different times for discussion purposes, these operations may actually occur at the same time.

At 310, the wireless device 305-a may identify a set of resources that may be reserved for a secret key derivation process between the UE 115-b and another wireless device 305, where the secret key derivation process may include an exchange of reference signals between the UE 115-b and the other wireless device 305. In the example of process flow 300, the secret key derivation process may occur between the UE 115-b and the wireless device 305-a.

At 320, the UE 115-b may identify, while the UE 115-b is in an idle state with respect to communications with the wireless device 305-a, a set of resources that is reserved for a secret key derivation process that includes an exchange of reference signals between the UE 115-b and the wireless device 305-a using the set of resources. In some examples, the UE 115-b may identify the set of resources as a periodic set of resources available for use by a plurality of wireless devices 305 that includes the UE 115-b.

In some examples, the UE 115-b may identify the set of resources as an individual wideband SL-RS resources per sidelink resource pool, where the UE 115-b may be a first sidelink device and the wireless device 305-a may be a second sidelink device that is one of a relay UE, a primary UE, or a PLC UE. In some examples, identifying the set of resources may further include reserving the set of resources during one or more sidelink channel reservation occasions, where the one or more sidelink channel reservation occasions are available for a plurality of wireless devices 305 to compete for access to the setoff resources. In such examples, the UE 115-b may obtain access to the one or more channel reservation occasions, where obtaining access to the one or more channel reservation occasions may be based at least in part on a data priority, data security requirements, or both, associated with the UE 115-b.

In some examples, the UE 115-b may select the set of resources based on an SSB index used by the UE 115-b to communicate with the wireless device 305-a (e.g., a base station, a sidelink device). For example, the UE 115-b may communicate with a base station via a transmit beam, where the transmit beam is associated with an SSB having an SSB index. The UE 115-b may select the set of resources based on the SSB index associated with the transmit beam. In some examples, the UE 115-b may select the set of resources based at least in part on a RACH occasion and a preamble index used by the UE 115-b to communicate with the wireless device 305-a. For example, the UE 115-b may transmit a preamble to a base station during a RACH occasion, where the UE 115-b may select the set of resources for secret key extraction based at least in part on the RACH occasion and a preamble index of the preamble transmitted to the base station.

In some examples, identifying the set of resources may further include receiving an indication or configuration from the wireless device 305-a. In some cases, at 315, the wireless device 305-a may transmit, and the UE 115-b may receive a resource indication or a resource configuration associated with the UE 115-b identifying the set of resources. For example, the UE 115-b may receive an index of the set of resources, where the index is included in a PBCH (e.g., from a base station or a sidelink device). In another example, the UE 115-b may receive an index of the set of resources from the wireless device 305-a, where the index is included in at least one of a MIB, a SIB, an OSIB, or a downlink RACH message (e.g., Msg 2, Msg4). In some other examples, the UE 115-b may receive a configuration of the set of resources from the wireless device 305-a, where the configuration may be indicated in a least one of a MIB, a SIB, an OSIB, or a downlink RACH message (e.g., Msg2, Msg4). In some cases, the UE 115-b may receive, via a MIB, a configuration of the set of resources such that the wireless communications that are secured using the secret key may include receipt of a SIB and exchange of one or more RACH messages. In some cases, the UE 115-b may receive, via a SIB, a configuration of the set of resources such that the wireless communications that are secured using the secret key may include exchange of one or more RACH messages. In some cases, the UE 115-b may receive, via an OSIB, a configuration of the set of resources such that the wireless communications that are secured using the secret key may include exchange of one or more RACH messages. In yet other cases, the UE 115-b may receive, via a downlink RACH message, a configuration of the set of resources such that the wireless communications that are secured using the secret key may include receipt exchange of additional RACH messages subsequent to the downlink RACH message.

At 325, the UE 115-b may transmit a first reference signal to the wireless device 305-a using the set of resources in accordance with the secret key derivation process. That is, the UE 115-b may transmit an SRS (e.g., in cases where the wireless device 305-a is a base station) or an SL-RS (e.g., in cases where the wireless device 305-a is a sidelink device) to the wireless device 305-a.

At 330, the UE 115-b may receive, a second reference signal from the wireless device 305-a in accordance with the secret key derivation process. For example, the UE 115-b may receive a CSI-RS (e.g., in cases where the wireless device 305-a is a base station) or an SL-RS (e.g., in cases where the wireless device 305-a is a sidelink device) from the wireless device 305-a.

At 335, the UE 115-b may estimate a communications channel between the UE 115-b and the wireless device 305-a based at least in part on the second reference signal and in accordance with the secret key derivation process. In some examples, the UE 115-b may perform measurements on the second reference signal for channel estimation.

At 340, the UE 115-b may determine the secret key based at least in part on the communications channel estimated by the UE 115-b in accordance with the secret key derivation process. In some examples, the UE 115-b may apply channel measurements and, in some cases, one or more other factors associated with key derivation into a KDF to determine a secret key based on channel randomness (e.g., type A). In other examples, the UE 115-b may determine the secret key based on an indication associated with the second reference signal (e.g., in a preamble). In such examples, the wireless device 305-*a* may determine the secret key for secure communications between the UE 115-*b* and the wireless device 305-*a* and may indicate the secret key to the UE 115-*b* with the second reference signal.

At 345, the UE 115-*b* may communicate with a selected wireless device 305 over the communications channel using wireless communications that are secured using the secret key. For example, the UE 115-*b* may engage in secure communications with the wireless device 305-*a* over the communications channel, preventing other wireless devices, such as wireless device 305-*b* from eavesdropping. In another example, the UE 115-*b* may engage in secure communications with more than one wireless device 305, where in the example of process flow 300, the UE 115-*b* may engage in secure communications with the wireless device 305-*a* and the wireless device 305-*b* (e.g., where wireless device 305-*b* may be signaled a group common secret key from the UE 115-*b*, the wireless device 305-*a*, or both).

Supporting the use of specific resources for secret key extraction may enable devices to secure communications relatively quickly. That is, defining resource sets for secret key reference signal exchange may enable devices to identify reference signals on agreed upon resources, resulting in relatively quick securing of communications.

Figure 4:
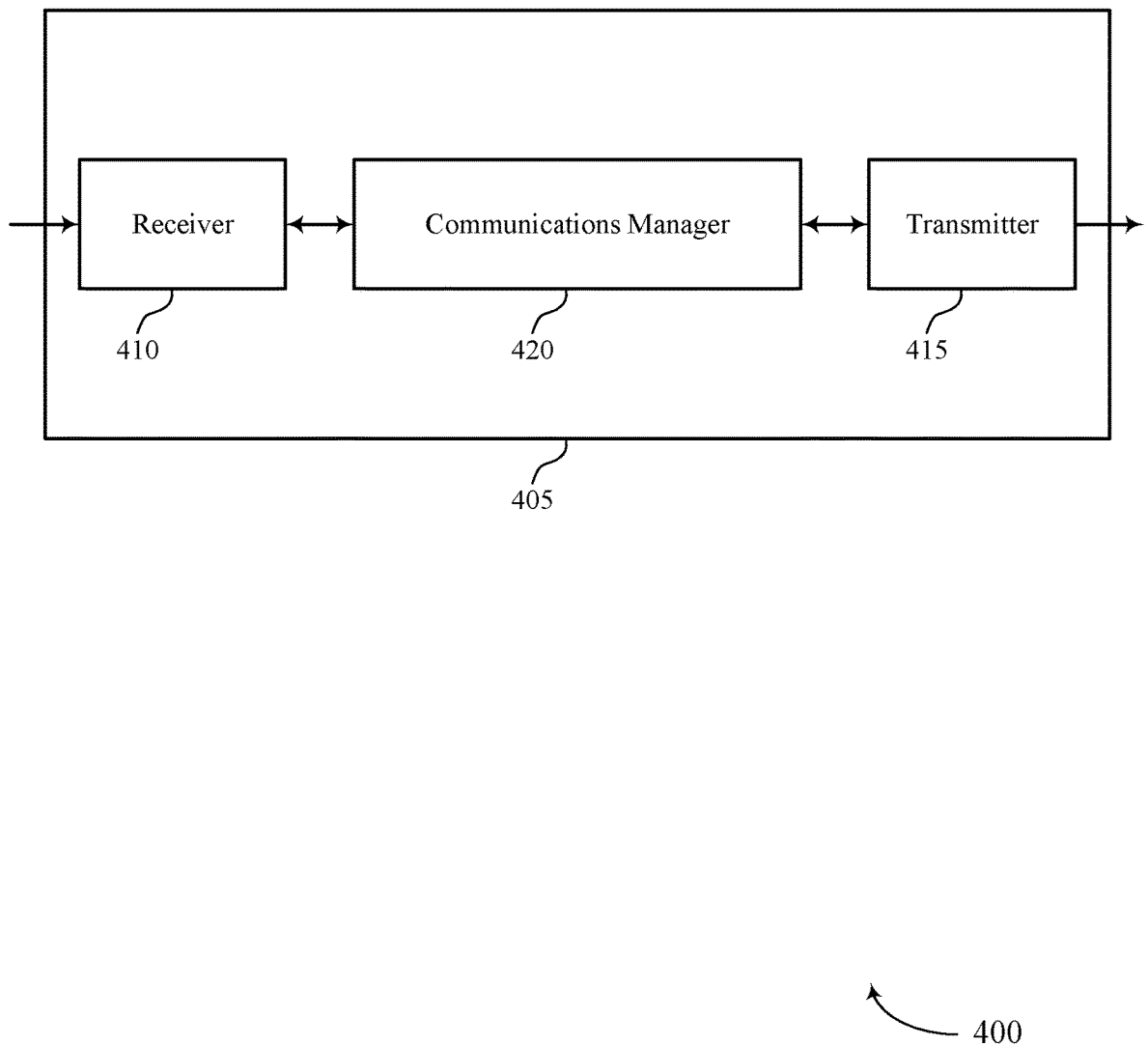
FIGS. 4 and 5 show block diagrams of devices that support preconfigured reference signal resources for secret key extraction in accordance with aspects of the present disclosure.

FIG. 4 shows a block diagram 400 of a device 405 that supports preconfigured reference signal resources for secret key extraction in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to preconfigured reference signal resources for secret key extraction). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to preconfigured reference signal resources for secret key extraction). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of preconfigured reference signal resources for secret key extraction as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for identifying, while the UE is in an idle state with respect to communications with a first wireless device, a set of resources that is reserved for a secret key derivation process that includes an exchange of reference signals between the UE and the first wireless device using the set of resources. The communications manager 420 may be configured as or otherwise support a means for transmitting a first reference signal to the first wireless device using the set of resources in accordance with the secret key derivation process. The communications manager 420 may be configured as or otherwise support a means for receiving a second reference signal from the first wireless device in accordance with the secret key derivation process. The communications manager 420 may be configured as or otherwise support a means for estimating a communications channel between the UE and the first wireless device based on the second reference signal and in accordance with the secret key derivation process. The communications manager 420 may be configured as or otherwise support a means for determining the secret key based on the communications channel estimated by the UE in accordance with the secret key derivation process. The communications manager 420 may be configured as or otherwise support a means for communicating with a selected wireless device over the communications channel using wireless communications that are secured using the secret key.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for providing wireless devices with reference signal resources to use as part of a secret key derivation process, resulting in reduced processing, reduced power consumption, and more efficient utilization of communication resources.

Figure 5:
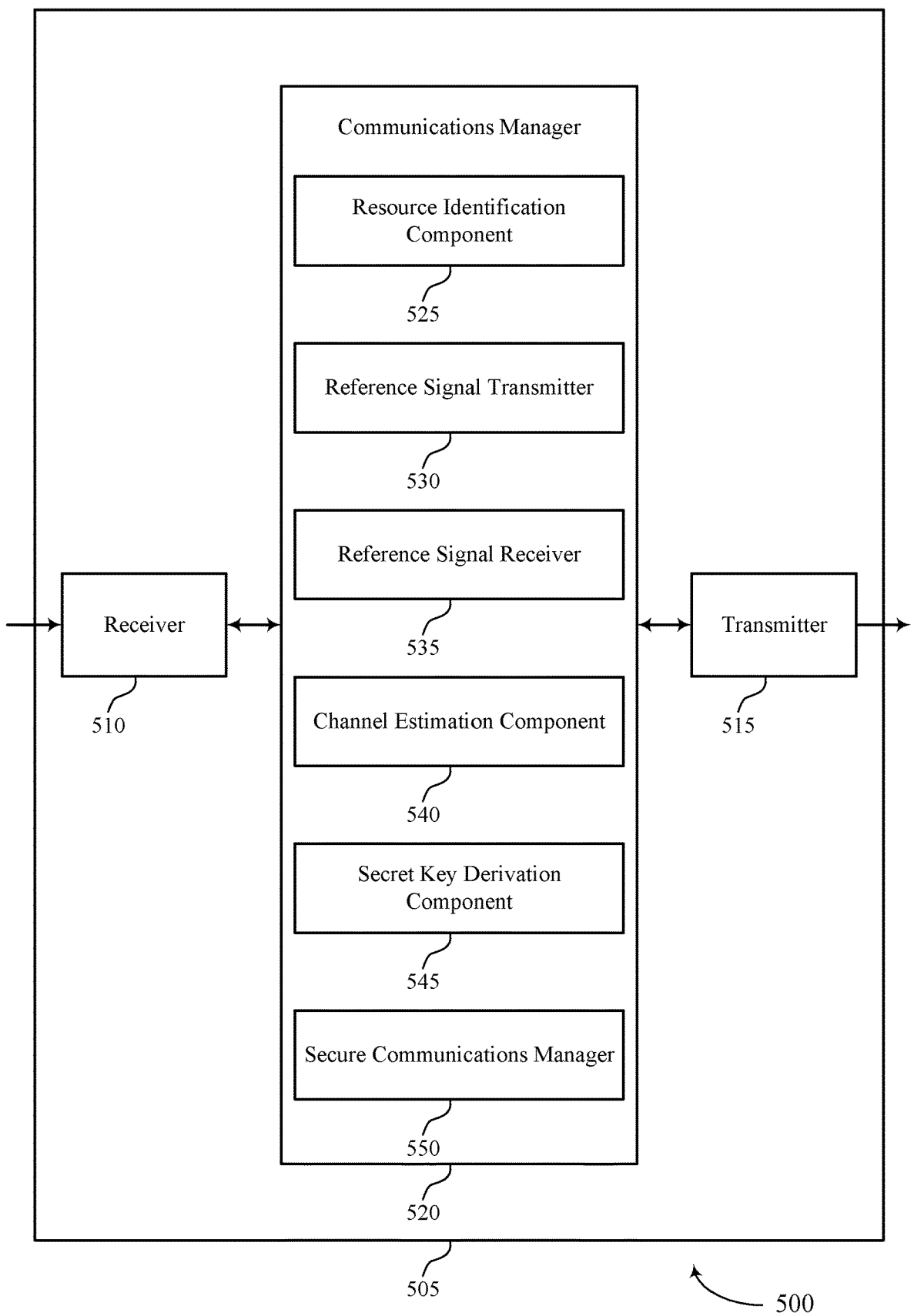

FIG. 5 shows a block diagram 500 of a device 505 that supports preconfigured reference signal resources for secret key extraction in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to preconfigured reference signal resources for secret key extraction). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to preconfigured reference signal resources for secret key extraction). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of preconfigured reference signal resources for secret key extraction as described herein. For example, the communications manager 520 may include a resource identification component 525, a reference signal transmitter 530, a reference signal receiver 535, a channel estimation component 540, a secret key derivation component 545, a secure communications manager 550, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The resource identification component 525 may be configured as or otherwise support a means for identifying, while the UE is in an idle state with respect to communications with a first wireless device, a set of resources that is reserved for a secret key derivation process that includes an exchange of reference signals between the UE and the first wireless device using the set of resources. The reference signal transmitter 530 may be configured as or otherwise support a means for transmitting a first reference signal to the first wireless device using the set of resources in accordance with the secret key derivation process. The reference signal receiver 535 may be configured as or otherwise support a means for receiving a second reference signal from the first wireless device in accordance with the secret key derivation process. The channel estimation component 540 may be configured as or otherwise support a means for estimating a communications channel between the UE and the first wireless device based on the second reference signal and in accordance with the secret key derivation process. The secret key derivation component 545 may be configured as or otherwise support a means for determining the secret key based on the communications channel estimated by the UE in accordance with the secret key derivation process. The secure communications manager 550 may be configured as or otherwise support a means for communicating with a selected wireless device over the communications channel using wireless communications that are secured using the secret key.

Figure 6:
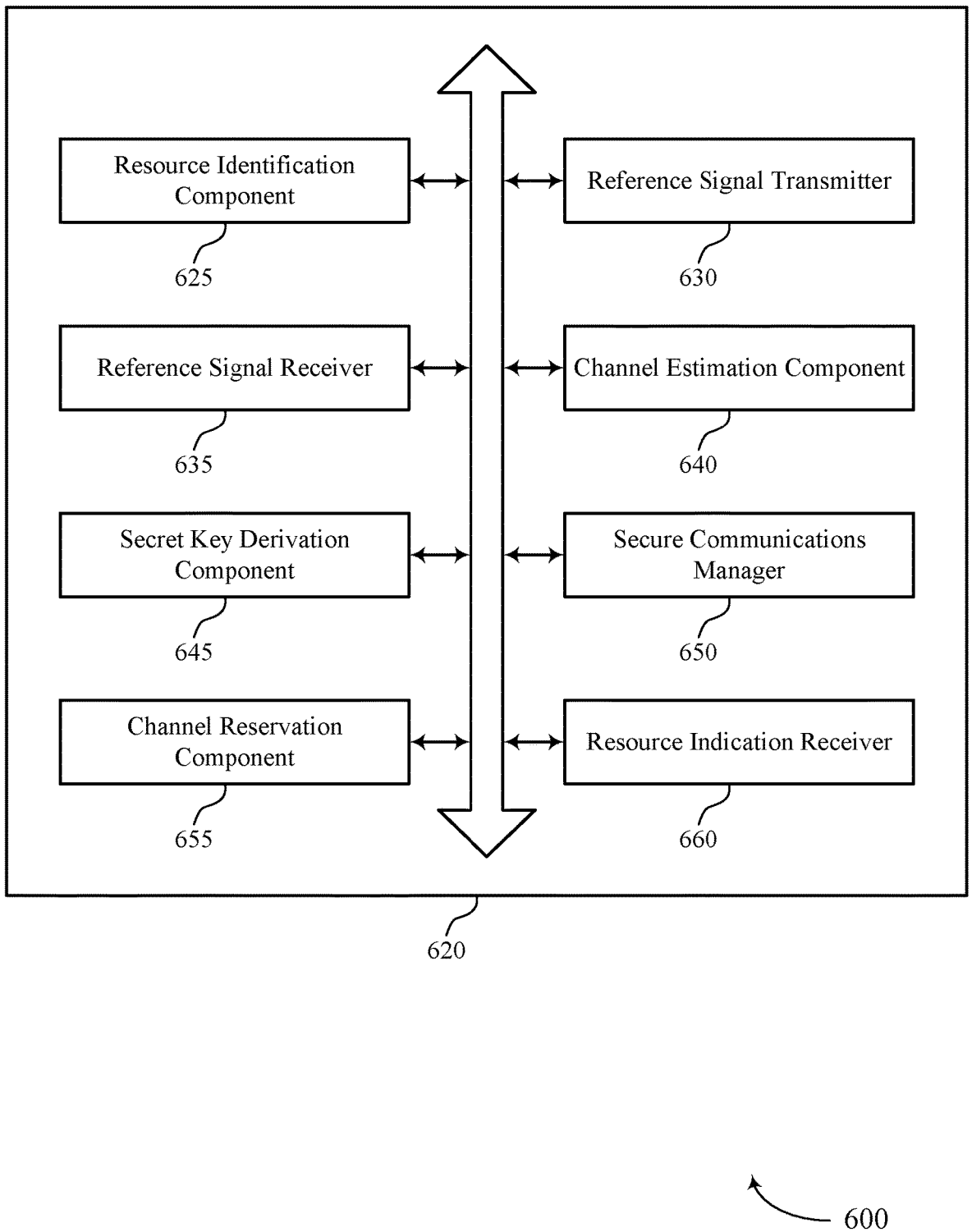
FIG. 6 shows a block diagram of a communications manager that supports preconfigured reference signal resources for secret key extraction in accordance with aspects of the present disclosure.

FIG. 6 shows a block diagram 600 of a communications manager 620 that supports preconfigured reference signal resources for secret key extraction in accordance with aspects of the present disclosure. The communications manager 620 may be an example of aspects of a communications manager 420, a communications manager 520, or both, as described herein. The communications manager 620, or various components thereof, may be an example of means for performing various aspects of preconfigured reference signal resources for secret key extraction as described herein. For example, the communications manager 620 may include a resource identification component 625, a reference signal transmitter 630, a reference signal receiver 635, a channel estimation component 640, a secret key derivation component 645, a secure communications manager 650, a channel reservation component 655, a resource indication receiver 660, or any combination thereof. Each of these components may communicate, directly or indirectly, with one another (e.g., via one or more buses).

The communications manager 620 may support wireless communications at a UE in accordance with examples as disclosed herein. The resource identification component 625 may be configured as or otherwise support a means for identifying, while the UE is in an idle state with respect to communications with a first wireless device, a set of resources that is reserved for a secret key derivation process that includes an exchange of reference signals between the UE and the first wireless device using the set of resources. The reference signal transmitter 630 may be configured as or otherwise support a means for transmitting a first reference signal to the first wireless device using the set of resources in accordance with the secret key derivation process. The reference signal receiver 635 may be configured as or otherwise support a means for receiving a second reference signal from the first wireless device in accordance with the secret key derivation process. The channel estimation component 640 may be configured as or otherwise support a means for estimating a communications channel between the UE and the first wireless device based on the second reference signal and in accordance with the secret key derivation process. The secret key derivation component 645 may be configured as or otherwise support a means for determining the secret key based on the communications channel estimated by the UE in accordance with the secret key derivation process. The secure communications manager 650 may be configured as or otherwise support a means for communicating with a selected wireless device over the communications channel using wireless communications that are secured using the secret key.

In some examples, to support identifying the set of resources, the resource identification component 625 may be configured as or otherwise support a means for identifying the set of resources as a periodic set of resources available for use by a set of multiple wireless devices that includes the UE.

In some examples, to support identifying the set of resources, the resource identification component 625 may be configured as or otherwise support a means for identifying the set of resources as individual wideband SL-RS resources per sidelink resource pool, where the UE is a first sidelink device and the first wireless device is a second sidelink device that is one of a relay UE, a primary UE, or an PLC UE.

In some examples, to support identifying the set of resources, the channel reservation component 655 may be configured as or otherwise support a means for reserving the set of resources during one or more sidelink channel reservation occasions, where the one or more sidelink channel reservation occasions are available for a set of multiple wireless devices to compete for access to the set of resources.

In some examples, the channel reservation component 655 may be configured as or otherwise support a means for obtaining access to the one or more channel reservation occasions, where obtaining access to the one or more channel reservation occasions is based at least in part on a data priority, data security requirements, or both, associated with the UE.

In some examples, to support identifying the set of resources, the resource identification component 625 may be configured as or otherwise support a means for selecting the set of resources based on a SSB index used by the UE to communicate with a base station. In some examples, the first reference signal is QCLed with an SSB associated with the SSB index.

In some examples, to support identifying the set of resources, the resource identification component 625 may be configured as or otherwise support a means for selecting the set of resources based on a random access occasion and preamble index used by the UE to communicate with a base station.

In some examples, to support identifying the set of resources, the resource indication receiver 660 may be configured as or otherwise support a means for receiving an index of the set of resources from a base station, where the index is included in at least one of a MIB, an SIB, an OSIB, or a downlink RACH message.

In some examples, to support identifying the set of resources, the resource indication receiver 660 may be configured as or otherwise support a means for receiving an index of the set of resources, where the index is included in a physical broadcast channel.

In some examples, to support identifying the set of resources, the resource indication receiver 660 may be configured as or otherwise support a means for receiving a configuration of the set of resources from a base station, where the configuration is indicated in at least one of a MIB, an SIB, an OSIB, or a downlink RACH message.

In some examples, to support identifying the set of resources, the resource indication receiver 660 may be configured as or otherwise support a means for receiving, via a MIB, a configuration of the set of resources such that the wireless communications that are secured using the secret key include receipt of an SIB and exchange of one or more RACH messages.

In some examples, to support identifying the set of resources, the resource indication receiver 660 may be configured as or otherwise support a means for receiving, via an SIB, a configuration of the set of resources such that the wireless communications that are secured using the secret key include exchange of one or more RACH messages.

In some examples, to support identifying the set of resources, the resource indication receiver 660 may be configured as or otherwise support a means for receiving, via an OSIB, a configuration of the set of resources such that the wireless communications that are secured using the secret key include exchange of one or more RACH messages.

In some examples, to support identifying the set of resources, the resource indication receiver 660 may be configured as or otherwise support a means for receiving, via a downlink RACH message, a configuration of the set of resources such that the wireless communications that are secured using the secret key include receipt exchange of additional RACH messages subsequent to the downlink RACH message.

In some examples, the first reference signal is an SRS or a SL-RS while the second reference signal is a CSI-RS or SL-RS. In some examples, the selected wireless device is either the first wireless device or another wireless device.

Figure 7:
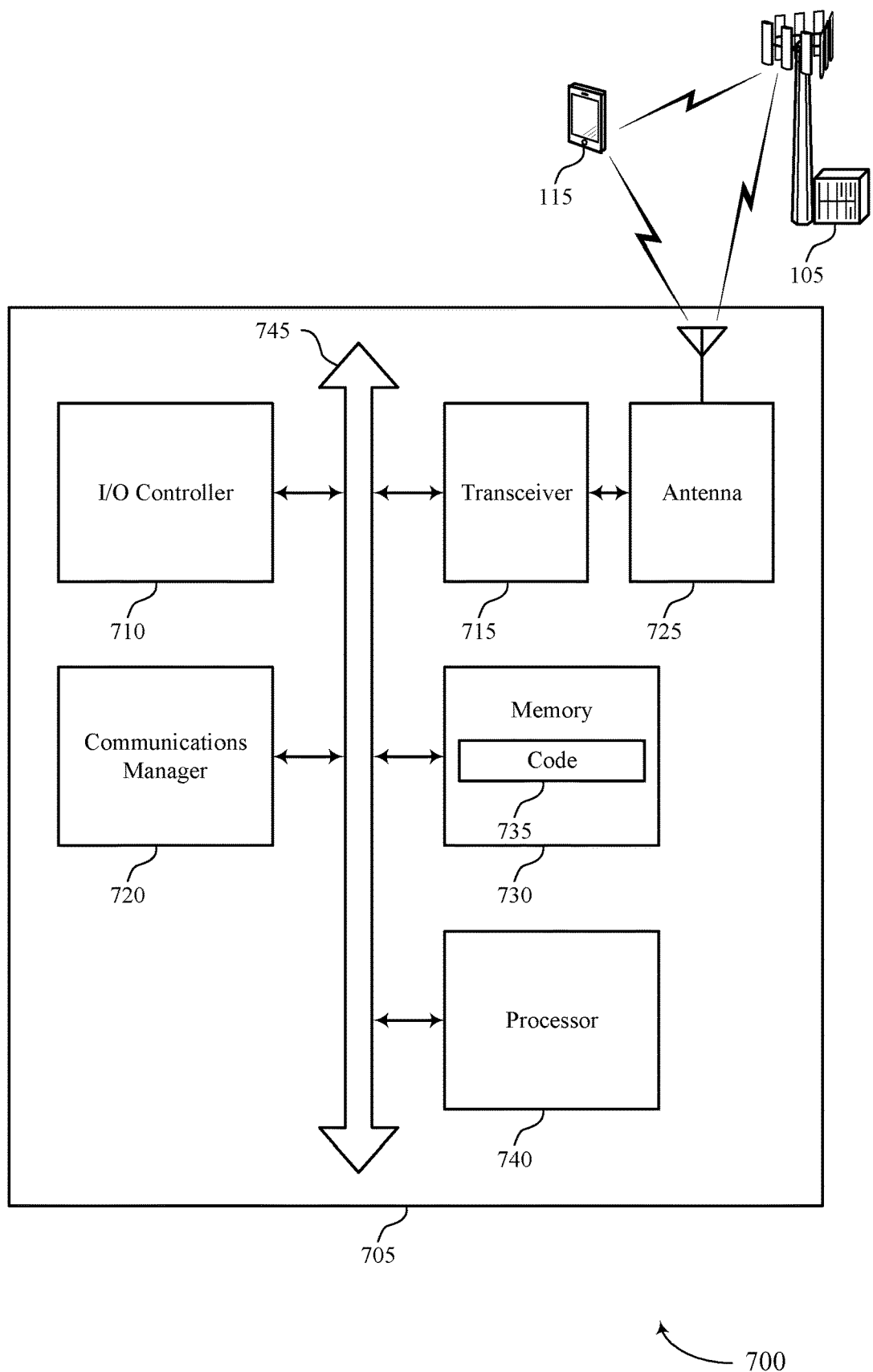
FIG. 7 shows a diagram of a system including a device that supports preconfigured reference signal resources for secret key extraction in accordance with aspects of the present disclosure.

FIG. 7 shows a diagram of a system 700 including a device 705 that supports preconfigured reference signal resources for secret key extraction in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting preconfigured reference signal resources for secret key extraction). For example, the device 705 or a component of the device 705 may include a processor 740 and memory 730 coupled to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for identifying, while the UE is in an idle state with respect to communications with a first wireless device, a set of resources that is reserved for a secret key derivation process that includes an exchange of reference signals between the UE and the first wireless device using the set of resources. The communications manager 720 may be configured as or otherwise support a means for transmitting a first reference signal to the first wireless device using the set of resources in accordance with the secret key derivation process. The communications manager 720 may be configured as or otherwise support a means for receiving a second reference signal from the first wireless device in accordance with the secret key derivation process. The communications manager 720 may be configured as or otherwise support a means for estimating a communications channel between the UE and the first wireless device based on the second reference signal and in accordance with the secret key derivation process. The communications manager 720 may be configured as or otherwise support a means for determining the secret key based on the communications channel estimated by the UE in accordance with the secret key derivation process. The communications manager 720 may be configured as or otherwise support a means for communicating with a selected wireless device over the communications channel using wireless communications that are secured using the secret key.

By including or configuring the communications manager 720 in accordance with examples as described herein, the device 705 may support techniques for providing wireless devices with reference signal resources to use as part of a secret key derivation process, resulting in reduced latency, reduced power consumption, more efficient utilization of communication resources, improved coordination between devices, and improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of preconfigured reference signal resources for secret key extraction as described herein, or the processor 740 and the memory 730 may be otherwise configured to perform or support such operations.

Figure 8:
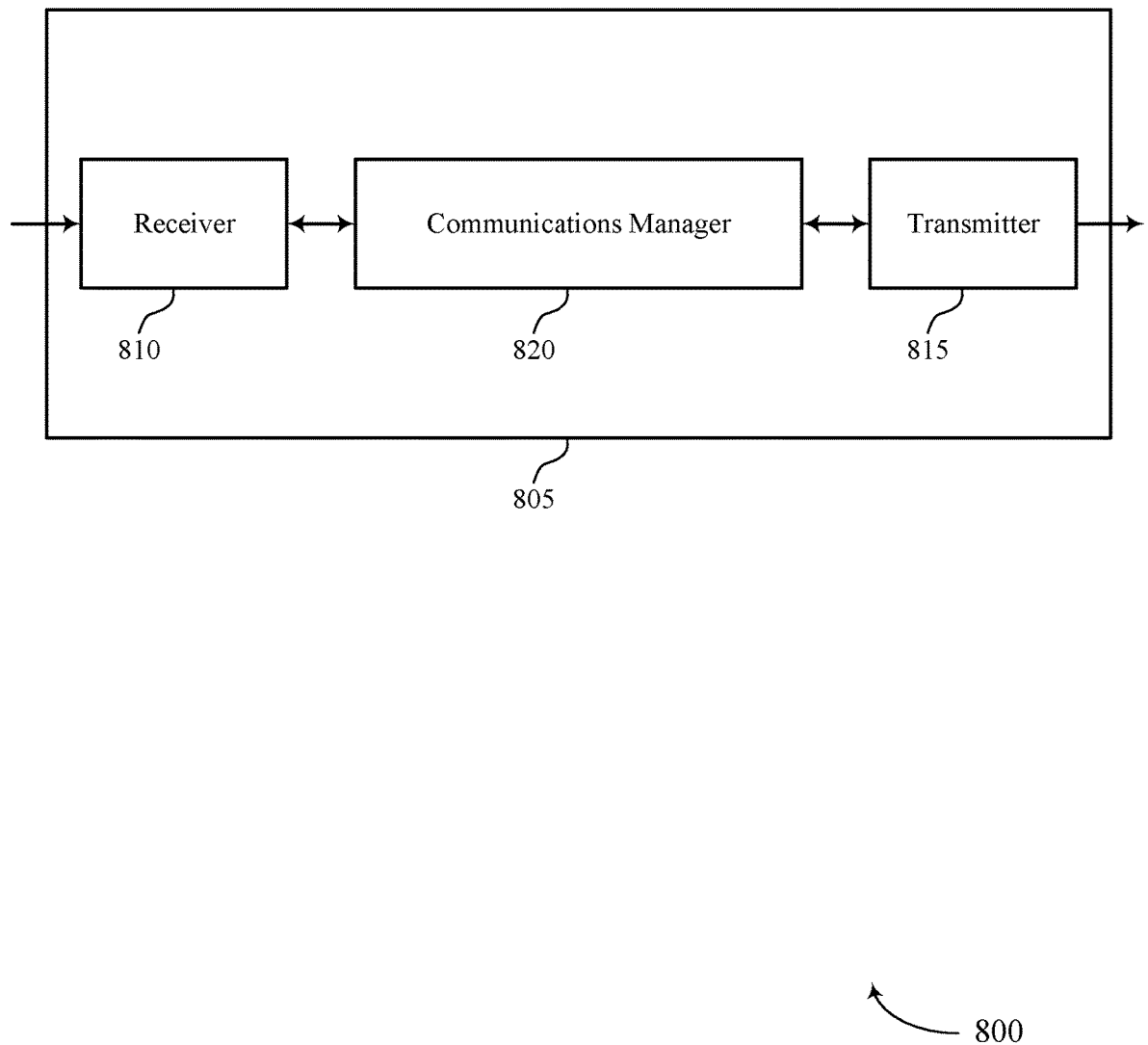
FIGS. 8 and 9 show block diagrams of devices that support preconfigured reference signal resources for secret key extraction in accordance with aspects of the present disclosure.

FIG. 8 shows a block diagram 800 of a device 805 that supports preconfigured reference signal resources for secret key extraction in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to preconfigured reference signal resources for secret key extraction). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to preconfigured reference signal resources for secret key extraction). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of preconfigured reference signal resources for secret key extraction as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a base station in accordance with examples as disclosed herein. For example, the communications manager 820 may be configured as or otherwise support a means for identifying a set of resources that is reserved for a secret key derivation process between a UE and another wireless device, where the secret key derivation process includes an exchange of reference signals between the UE and the other wireless device using the set of resources. The communications manager 820 may be configured as or otherwise support a means for transmitting an indication of the set of resources to the UE.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for providing wireless devices with reference signal resources to use as part of a secret key derivation process, resulting in reduced processing, reduced power consumption, and more efficient utilization of communication resources.

Figure 9:
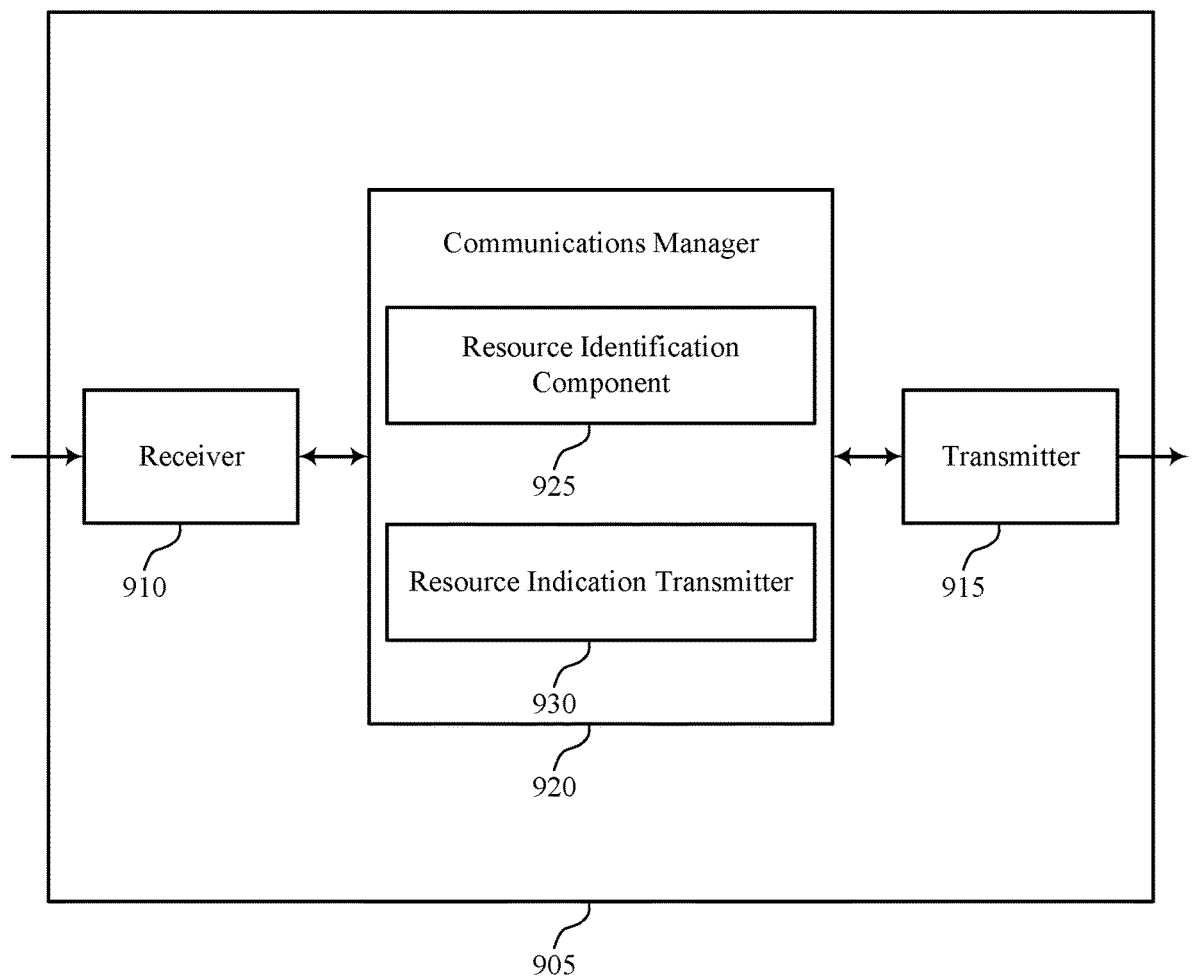

FIG. 9 shows a block diagram 900 of a device 905 that supports preconfigured reference signal resources for secret key extraction in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to preconfigured reference signal resources for secret key extraction). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to preconfigured reference signal resources for secret key extraction). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of preconfigured reference signal resources for secret key extraction as described herein. For example, the communications manager 920 may include a resource identification component 925 a resource indication transmitter 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. The resource identification component 925 may be configured as or otherwise support a means for identifying a set of resources that is reserved for a secret key derivation process between a UE and another wireless device, where the secret key derivation process includes an exchange of reference signals between the UE and the other wireless device using the set of resources. The resource indication transmitter 930 may be configured as or otherwise support a means for transmitting an indication of the set of resources to the UE.

Figure 10:
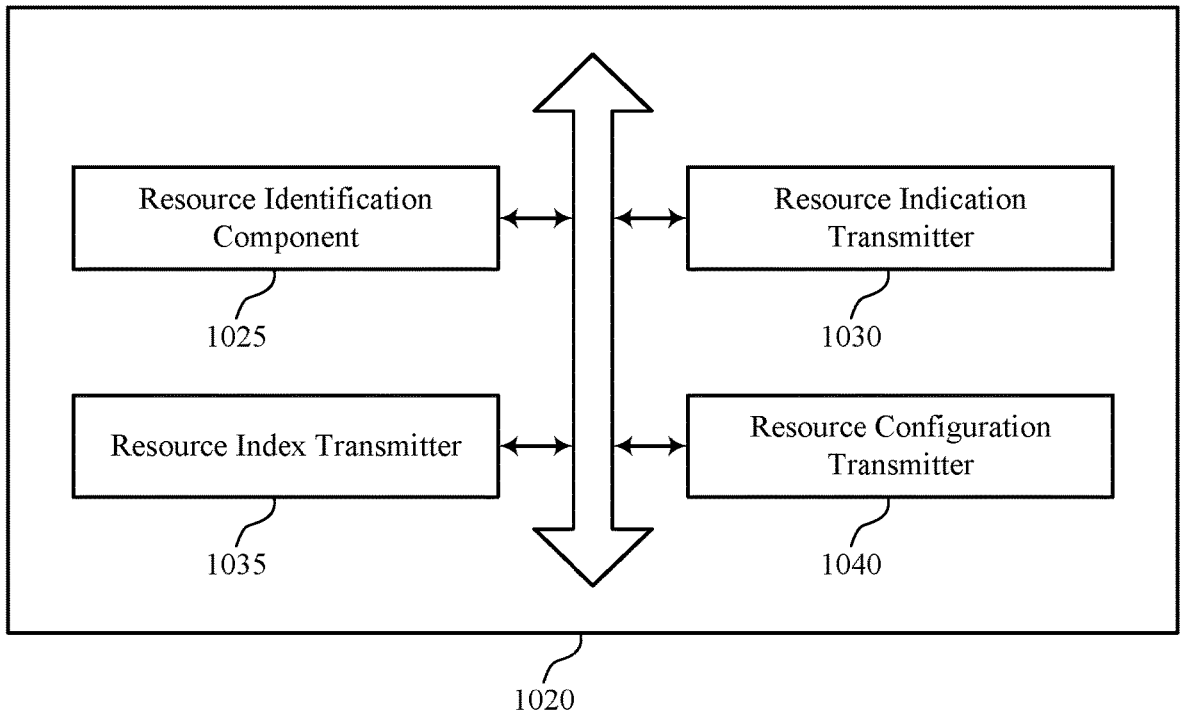
FIG. 10 shows a block diagram of a communications manager that supports preconfigured reference signal resources for secret key extraction in accordance with aspects of the present disclosure.

FIG. 10 shows a block diagram 1000 of a communications manager 1020 that supports preconfigured reference signal resources for secret key extraction in accordance with aspects of the present disclosure. The communications manager 1020 may be an example of aspects of a communications manager 820, a communications manager 920, or both, as described herein. The communications manager 1020, or various components thereof, may be an example of means for performing various aspects of preconfigured reference signal resources for secret key extraction as described herein. For example, the communications manager 1020 may include a resource identification component 1025, a resource indication transmitter 1030, a resource index transmitter 1035, a resource configuration transmitter 1040, or any combination thereof. Each of these components may communicate, directly or indirectly, with one another (e.g., via one or more buses).

The communications manager 1020 may support wireless communications at a base station in accordance with examples as disclosed herein. The resource identification component 1025 may be configured as or otherwise support a means for identifying a set of resources that is reserved for a secret key derivation process between a UE and another wireless device, where the secret key derivation process includes an exchange of reference signals between the UE and the other wireless device using the set of resources. The resource indication transmitter 1030 may be configured as or otherwise support a means for transmitting an indication of the set of resources to the UE.

In some examples, to support transmitting the indication of the set of resources to the UE, the resource index transmitter 1035 may be configured as or otherwise support a means for transmitting an index of the set of resources from a base station, where the index is included in at least one of a MIB, an SIB, an OSIB, or a downlink RACH message.

In some examples, to support transmitting the indication of the set of resources to the UE, the resource index transmitter 1035 may be configured as or otherwise support a means for transmitting an index of the set of resources, where the index is included in a PBCH.

In some examples, to support transmitting the indication of the set of resources to the UE, the resource configuration transmitter 1040 may be configured as or otherwise support a means for transmitting a configuration of the set of resources from a base station, where the configuration is indicated in at least one of a MIB, an SIB, an OSIB, or a downlink RACH message.

In some examples, to support transmitting the indication of the set of resources to the UE, the resource configuration transmitter 1040 may be configured as or otherwise support a means for transmitting, via a MIB, a configuration of the set of resources such that the wireless communications that are secured using the secret key include receipt of an SIB and exchange of one or more RACH messages.

In some examples, to support transmitting the indication of the set of resources to the UE, the resource configuration transmitter 1040 may be configured as or otherwise support a means for transmitting, via an SIB, a configuration of the set of resources such that the wireless communications that are secured using the secret key include exchange of one or more RACH messages.

In some examples, to support transmitting the indication of the set of resources to the UE, the resource configuration transmitter 1040 may be configured as or otherwise support a means for transmitting, via an OSIB, a configuration of the set of resources such that the wireless communications that are secured using the secret key include exchange of one or more RACH messages.

In some examples, to support identifying the set of resources, the resource configuration transmitter 1040 may be configured as or otherwise support a means for transmitting, via a downlink RACH message, a configuration of the set of resources such that the wireless communications that are secured using the secret key include receipt exchange of additional RACH messages subsequent to the downlink RACH message.

Figure 11:
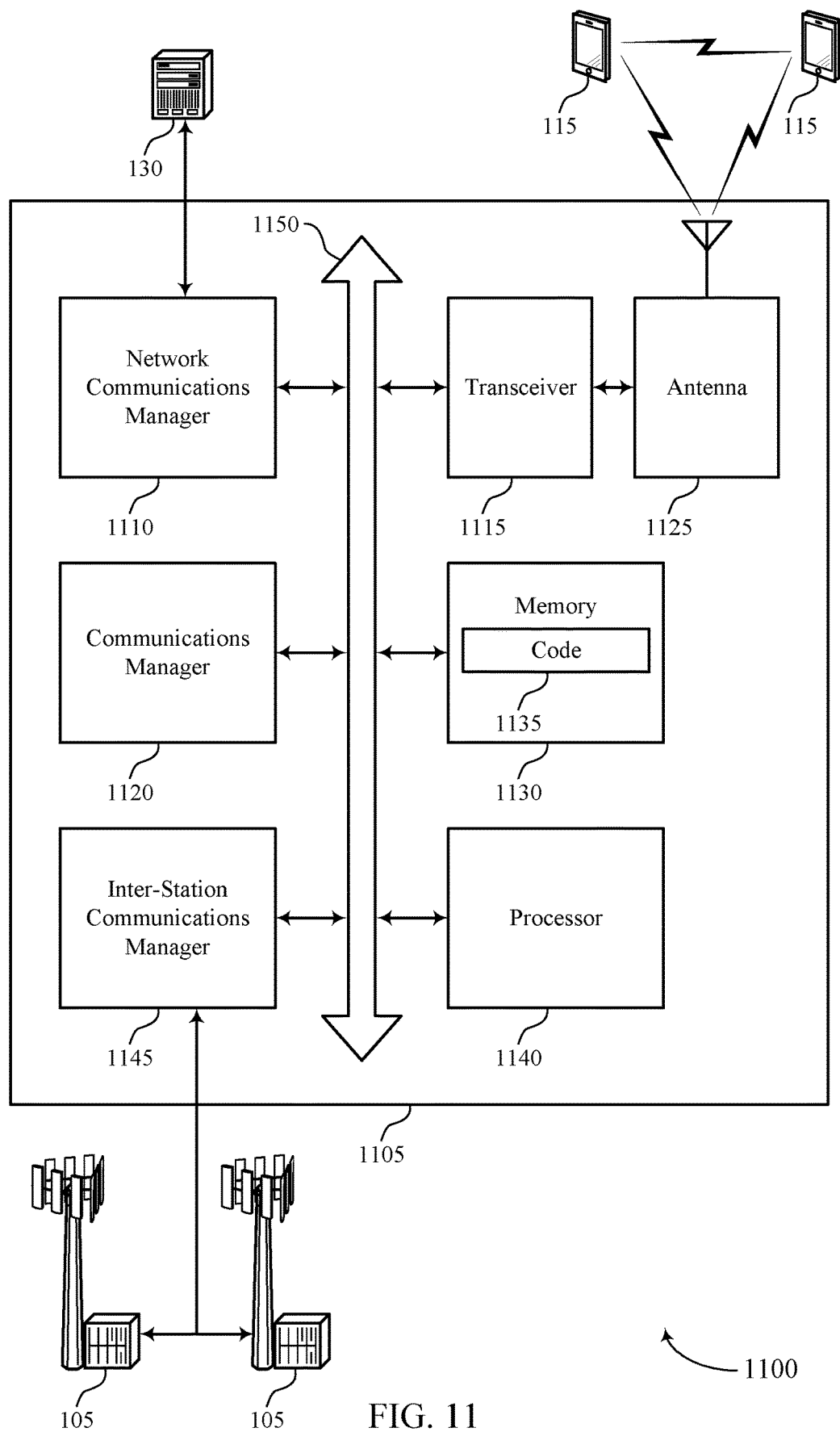
FIG. 11 shows a diagram of a system including a device that supports preconfigured reference signal resources for secret key extraction in accordance with aspects of the present disclosure.

FIG. 11 shows a diagram of a system 1100 including a device 1105 that supports preconfigured reference signal resources for secret key extraction in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting preconfigured reference signal resources for secret key extraction). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a base station in accordance with examples as disclosed herein. For example, the communications manager 1120 may be configured as or otherwise support a means for identifying a set of resources that is reserved for a secret key derivation process between a UE and another wireless device, where the secret key derivation process includes an exchange of reference signals between the UE and the other wireless device using the set of resources. The communications manager 1120 may be configured as or otherwise support a means for transmitting an indication of the set of resources to the UE.

By including or configuring the communications manager 1120 in accordance with examples as described herein, the device 1105 may support techniques for providing wireless devices with reference signal resources to use as part of a secret key derivation process, resulting in improved communication reliability, reduced latency, reduced power consumption, more efficient utilization of communication resources, improved coordination between devices, and improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of preconfigured reference signal resources for secret key extraction as described herein, or the processor 1140 and the memory 1130 may be otherwise configured to perform or support such operations.

Figure 12:
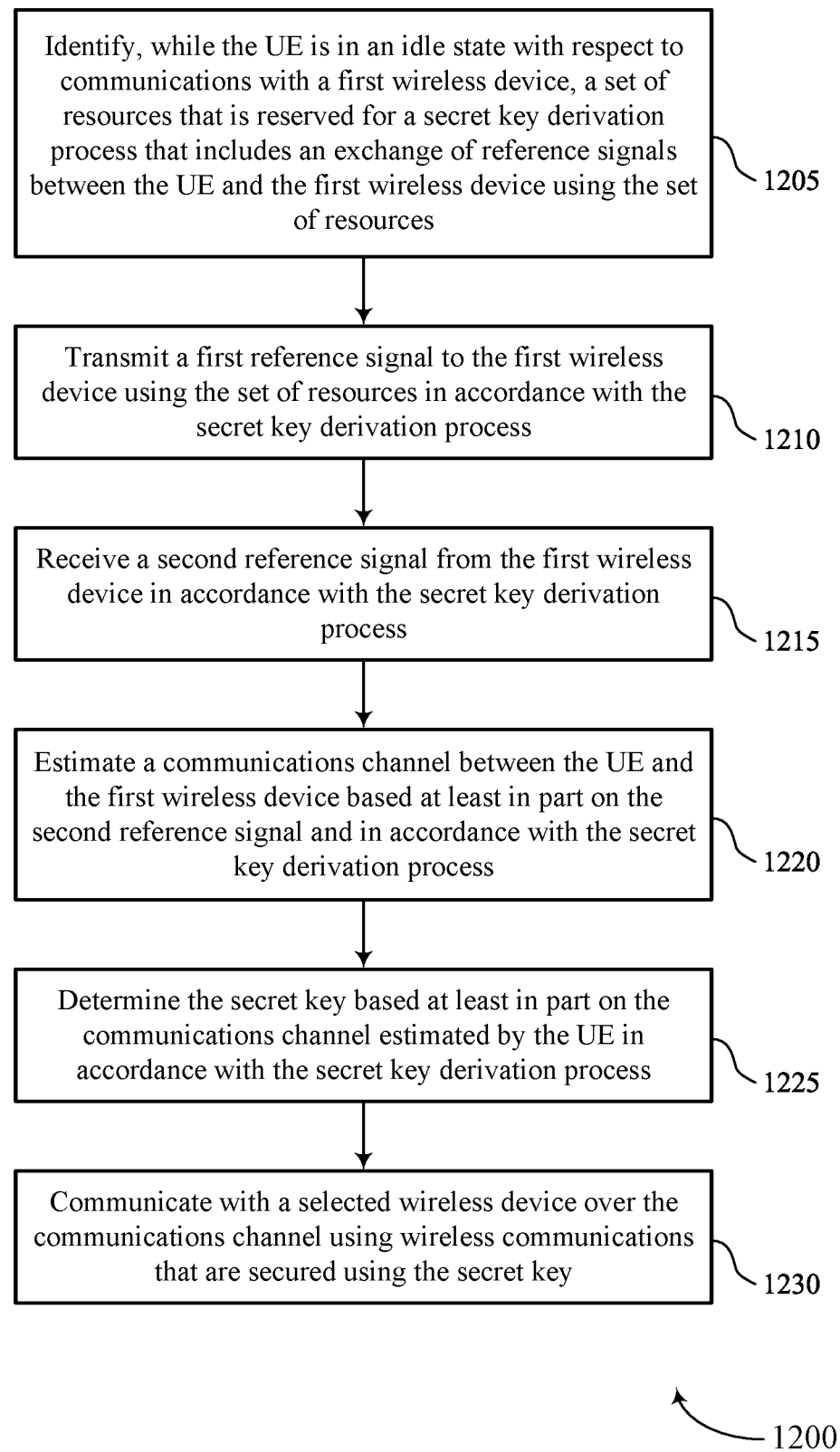
FIGS. 12 through 18 show flowcharts illustrating methods that support preconfigured reference signal resources for secret key extraction in accordance with aspects of the present disclosure.

FIG. 12 shows a flowchart illustrating a method 1200 that supports preconfigured reference signal resources for secret key extraction in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include identifying, while the UE is in an idle state with respect to communications with a first wireless device, a set of resources that is reserved for a secret key derivation process that includes an exchange of reference signals between the UE and the first wireless device using the set of resources. The operations of 1205 may be performed in accordance with examples as disclosed herein. In some examples, aspects of the operations of 1205 may be performed by a resource identification component 625 as described with reference to FIG. 6.

At 1210, the method may include transmitting a first reference signal to the first wireless device using the set of resources in accordance with the secret key derivation process. The operations of 1210 may be performed in accordance with examples as disclosed herein. In some examples, aspects of the operations of 1210 may be performed by a reference signal transmitter 630 as described with reference to FIG. 6.

At 1215, the method may include receiving a second reference signal from the first wireless device in accordance with the secret key derivation process. The operations of 1215 may be performed in accordance with examples as disclosed herein. In some examples, aspects of the operations of 1215 may be performed by a reference signal receiver 635 as described with reference to FIG. 6.

At 1220, the method may include estimating a communications channel between the UE and the first wireless device based on the second reference signal and in accordance with the secret key derivation process. The operations of 1220 may be performed in accordance with examples as disclosed herein. In some examples, aspects of the operations of 1220 may be performed by a channel estimation component 640 as described with reference to FIG. 6.

At 1225, the method may include determining the secret key based on the communications channel estimated by the UE in accordance with the secret key derivation process. The operations of 1225 may be performed in accordance with examples as disclosed herein. In some examples, aspects of the operations of 1225 may be performed by a secret key derivation component 645 as described with reference to FIG. 6.

At 1230, the method may include communicating with a selected wireless device over the communications channel using wireless communications that are secured using the secret key. The operations of 1230 may be performed in accordance with examples as disclosed herein. In some examples, aspects of the operations of 1230 may be performed by a secure communications manager 650 as described with reference to FIG. 6.

Figure 13:
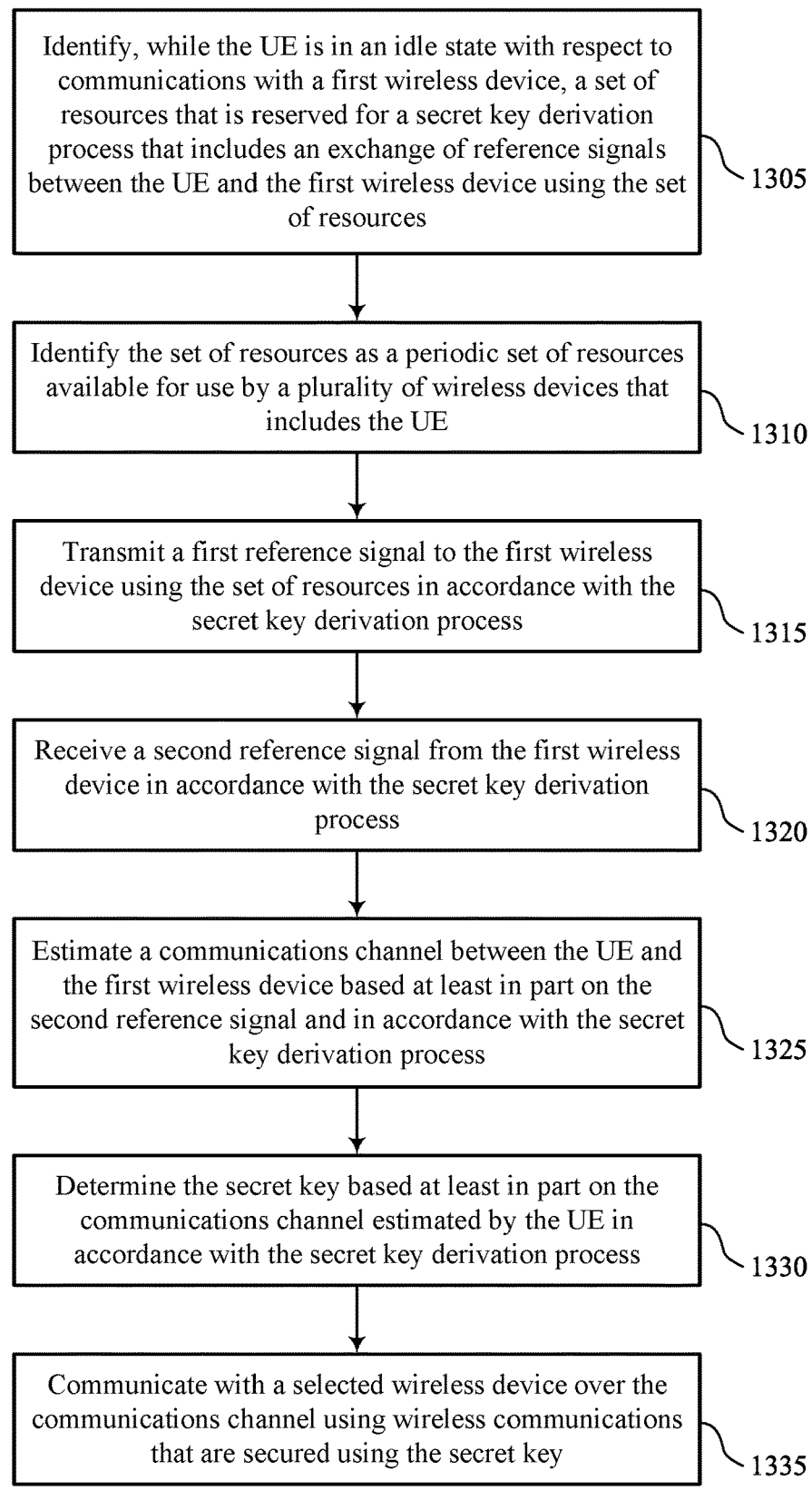

FIG. 13 shows a flowchart illustrating a method 1300 that supports preconfigured reference signal resources for secret key extraction in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include identifying, while the UE is in an idle state with respect to communications with a first wireless device, a set of resources that is reserved for a secret key derivation process that includes an exchange of reference signals between the UE and the first wireless device using the set of resources. The operations of 1305 may be performed in accordance with examples as disclosed herein. In some examples, aspects of the operations of 1305 may be performed by a resource identification component 625 as described with reference to FIG. 6.

At 1310, the method may include identifying the set of resources as a periodic set of resources available for use by a set of multiple wireless devices that includes the UE. The operations of 1310 may be performed in accordance with examples as disclosed herein. In some examples, aspects of the operations of 1310 may be performed by a resource identification component 625 as described with reference to FIG. 6.

At 1315, the method may include transmitting a first reference signal to the first wireless device using the set of resources in accordance with the secret key derivation process. The operations of 1315 may be performed in accordance with examples as disclosed herein. In some examples, aspects of the operations of 1315 may be performed by a reference signal transmitter 630 as described with reference to FIG. 6.

At 1320, the method may include receiving a second reference signal from the first wireless device in accordance with the secret key derivation process. The operations of 1320 may be performed in accordance with examples as disclosed herein. In some examples, aspects of the operations of 1320 may be performed by a reference signal receiver 635 as described with reference to FIG. 6.

At 1325, the method may include estimating a communications channel between the UE and the first wireless device based on the second reference signal and in accordance with the secret key derivation process. The operations of 1325 may be performed in accordance with examples as disclosed herein. In some examples, aspects of the operations of 1325 may be performed by a channel estimation component 640 as described with reference to FIG. 6.

At 1330, the method may include determining the secret key based on the communications channel estimated by the UE in accordance with the secret key derivation process. The operations of 1330 may be performed in accordance with examples as disclosed herein. In some examples, aspects of the operations of 1330 may be performed by a secret key derivation component 645 as described with reference to FIG. 6.

At 1335, the method may include communicating with a selected wireless device over the communications channel using wireless communications that are secured using the secret key. The operations of 1335 may be performed in accordance with examples as disclosed herein. In some examples, aspects of the operations of 1335 may be performed by a secure communications manager 650 as described with reference to FIG. 6.

Figure 14:
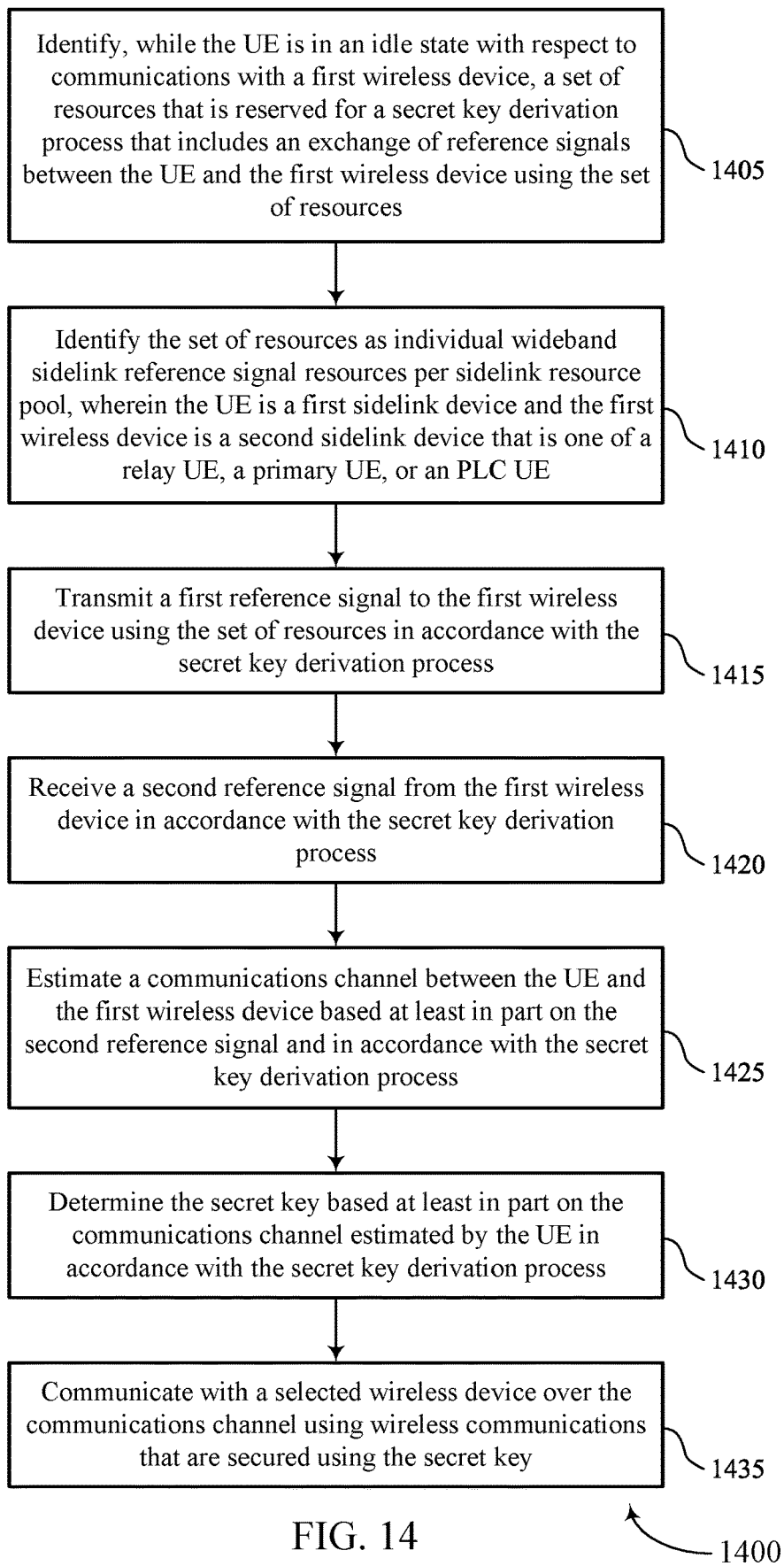

FIG. 14 shows a flowchart illustrating a method 1400 that supports preconfigured reference signal resources for secret key extraction in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include identifying, while the UE is in an idle state with respect to communications with a first wireless device, a set of resources that is reserved for a secret key derivation process that includes an exchange of reference signals between the UE and the first wireless device using the set of resources. The operations of 1405 may be performed in accordance with examples as disclosed herein. In some examples, aspects of the operations of 1405 may be performed by a resource identification component 625 as described with reference to FIG. 6.

At 1410, the method may include identifying the set of resources as individual wideband SL-RS resources per sidelink resource pool, where the UE is a first sidelink device and the first wireless device is a second sidelink device that is one of a relay UE, a primary UE, or an PLC UE. The operations of 1410 may be performed in accordance with examples as disclosed herein. In some examples, aspects of the operations of 1410 may be performed by a resource identification component 625 as described with reference to FIG. 6.

At 1415, the method may include transmitting a first reference signal to the first wireless device using the set of resources in accordance with the secret key derivation process. The operations of 1415 may be performed in accordance with examples as disclosed herein. In some examples, aspects of the operations of 1415 may be performed by a reference signal transmitter 630 as described with reference to FIG. 6.

At 1420, the method may include receiving a second reference signal from the first wireless device in accordance with the secret key derivation process. The operations of 1420 may be performed in accordance with examples as disclosed herein. In some examples, aspects of the operations of 1420 may be performed by a reference signal receiver 635 as described with reference to FIG. 6.

At 1425, the method may include estimating a communications channel between the UE and the first wireless device based on the second reference signal and in accordance with the secret key derivation process. The operations of 1425 may be performed in accordance with examples as disclosed herein. In some examples, aspects of the operations of 1425 may be performed by a channel estimation component 640 as described with reference to FIG. 6.

At 1430, the method may include determining the secret key based on the communications channel estimated by the UE in accordance with the secret key derivation process. The operations of 1430 may be performed in accordance with examples as disclosed herein. In some examples, aspects of the operations of 1430 may be performed by a secret key derivation component 645 as described with reference to FIG. 6.

At 1435, the method may include communicating with a selected wireless device over the communications channel using wireless communications that are secured using the secret key. The operations of 1435 may be performed in accordance with examples as disclosed herein. In some examples, aspects of the operations of 1435 may be performed by a secure communications manager 650 as described with reference to FIG. 6.

Figure 15:
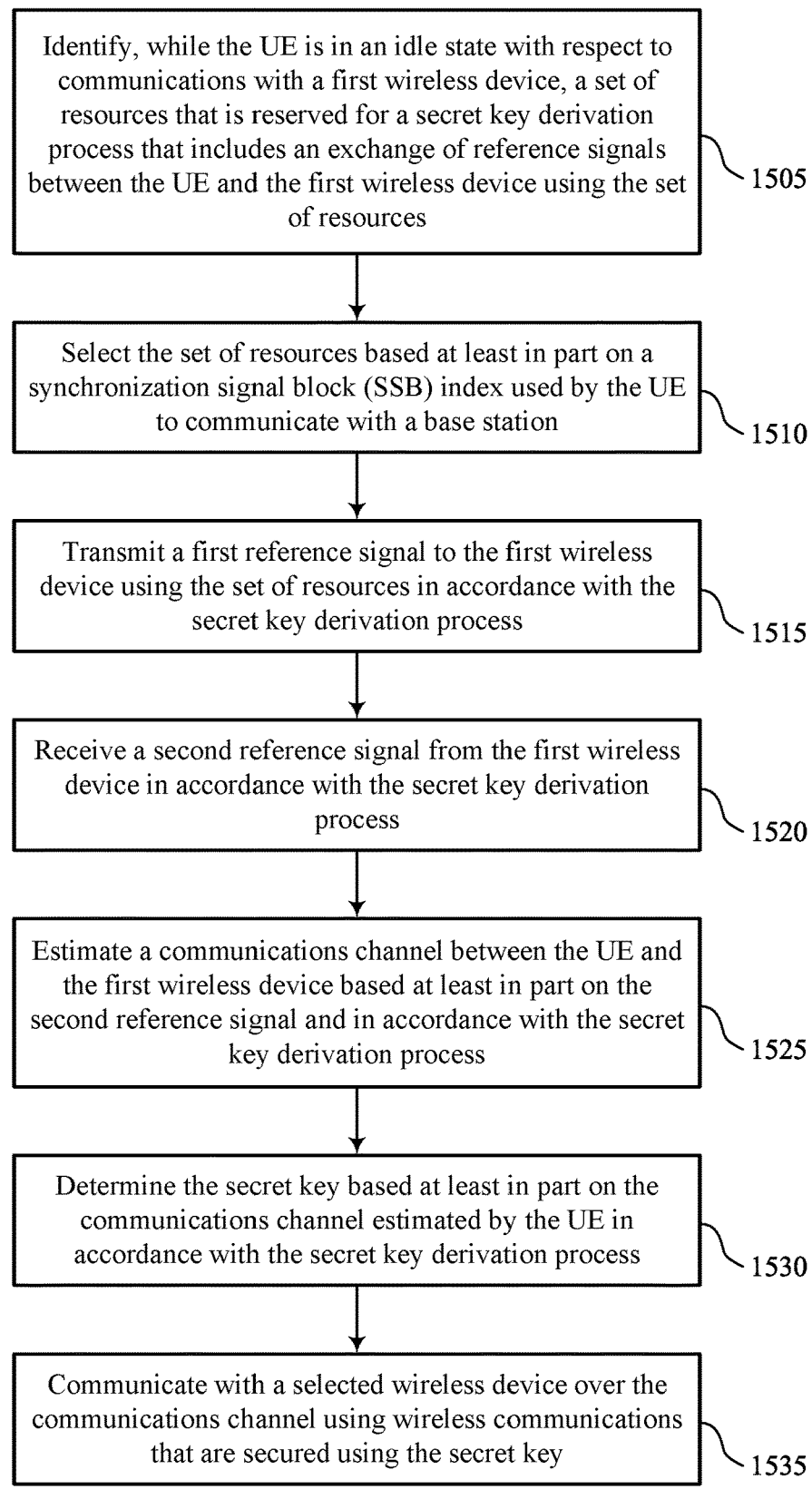

FIG. 15 shows a flowchart illustrating a method 1500 that supports preconfigured reference signal resources for secret key extraction in accordance with aspects of the present disclosure. The operations of the method 1500 may be implemented by a UE or its components as described herein. For example, the operations of the method 1500 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1505, the method may include identifying, while the UE is in an idle state with respect to communications with a first wireless device, a set of resources that is reserved for a secret key derivation process that includes an exchange of reference signals between the UE and the first wireless device using the set of resources. The operations of 1505 may be performed in accordance with examples as disclosed herein. In some examples, aspects of the operations of 1505 may be performed by a resource identification component 625 as described with reference to FIG. 6.

At 1510, the method may include selecting the set of resources based on a SSB index used by the UE to communicate with a base station. The operations of 1510 may be performed in accordance with examples as disclosed herein. In some examples, aspects of the operations of 1510 may be performed by a resource identification component 625 as described with reference to FIG. 6.

At 1515, the method may include transmitting a first reference signal to the first wireless device using the set of resources in accordance with the secret key derivation process. The operations of 1515 may be performed in accordance with examples as disclosed herein. In some examples, aspects of the operations of 1515 may be performed by a reference signal transmitter 630 as described with reference to FIG. 6.

At 1520, the method may include receiving a second reference signal from the first wireless device in accordance with the secret key derivation process. The operations of 1520 may be performed in accordance with examples as disclosed herein. In some examples, aspects of the operations of 1520 may be performed by a reference signal receiver 635 as described with reference to FIG. 6.

At 1525, the method may include estimating a communications channel between the UE and the first wireless device based on the second reference signal and in accordance with the secret key derivation process. The operations of 1525 may be performed in accordance with examples as disclosed herein. In some examples, aspects of the operations of 1525 may be performed by a channel estimation component 640 as described with reference to FIG. 6.

At 1530, the method may include determining the secret key based on the communications channel estimated by the UE in accordance with the secret key derivation process. The operations of 1530 may be performed in accordance with examples as disclosed herein. In some examples, aspects of the operations of 1530 may be performed by a secret key derivation component 645 as described with reference to FIG. 6.

At 1535, the method may include communicating with a selected wireless device over the communications channel using wireless communications that are secured using the secret key. The operations of 1535 may be performed in accordance with examples as disclosed herein. In some examples, aspects of the operations of 1535 may be performed by a secure communications manager 650 as described with reference to FIG. 6.

Figure 16:
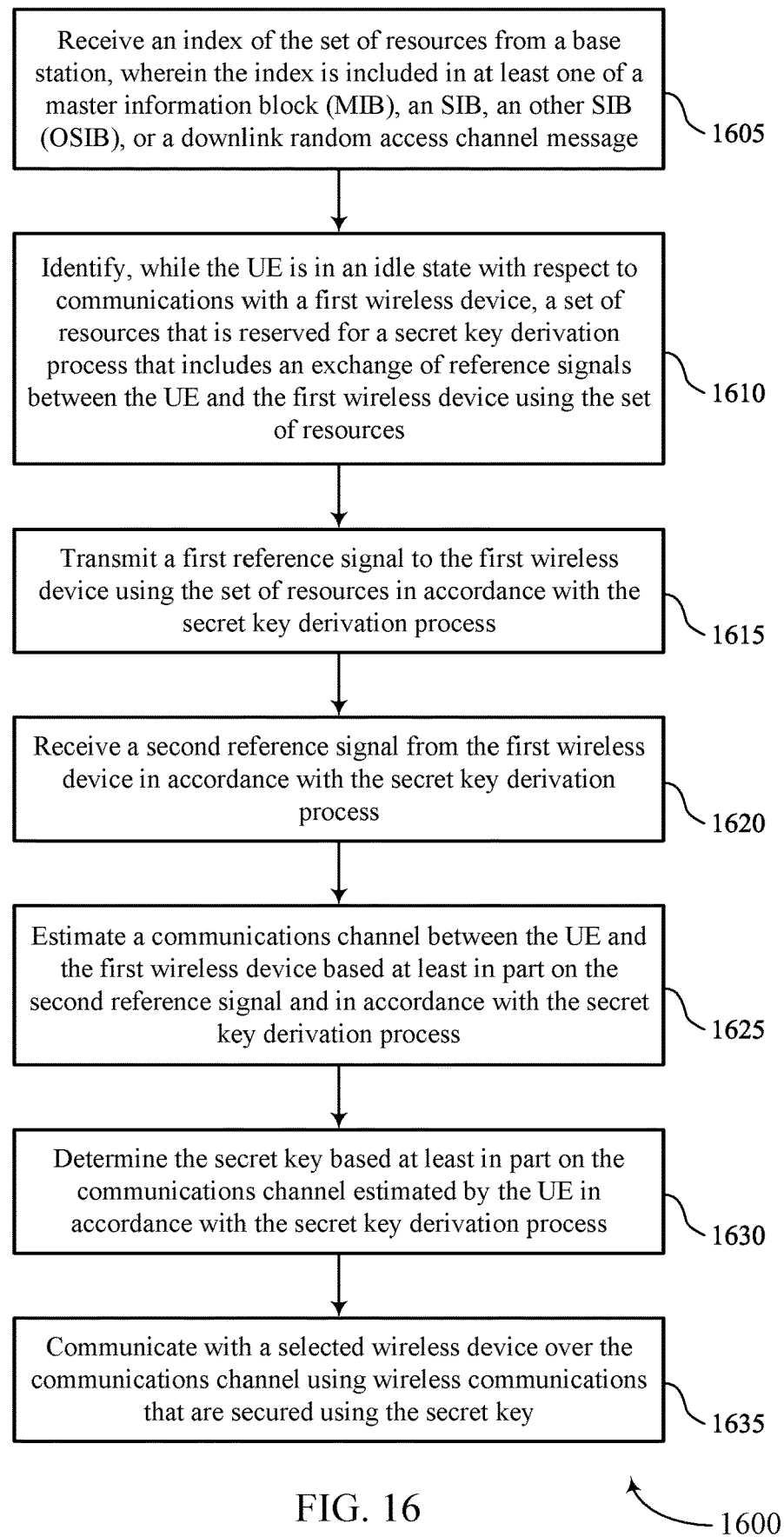

FIG. 16 shows a flowchart illustrating a method 1600 that supports preconfigured reference signal resources for secret key extraction in accordance with aspects of the present disclosure. The operations of the method 1600 may be implemented by a UE or its components as described herein. For example, the operations of the method 1600 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1605, the method may include receiving an index of the set of resources from a base station, where the index is included in at least one of a MIB, a SIB, an OSIB, or a downlink RACH message. The operations of 1605 may be performed in accordance with examples as disclosed herein. In some examples, aspects of the operations of 1605 may be performed by a resource indication receiver 660 as described with reference to FIG. 6.

At 1610, the method may include identifying, while the UE is in an idle state with respect to communications with a first wireless device, a set of resources that is reserved for a secret key derivation process that includes an exchange of reference signals between the UE and the first wireless device using the set of resources. The operations of 1610 may be performed in accordance with examples as disclosed herein. In some examples, aspects of the operations of 1610 may be performed by a resource identification component 625 as described with reference to FIG. 6.

At 1615, the method may include transmitting a first reference signal to the first wireless device using the set of resources in accordance with the secret key derivation process. The operations of 1615 may be performed in accordance with examples as disclosed herein. In some examples, aspects of the operations of 1615 may be performed by a reference signal transmitter 630 as described with reference to FIG. 6.

At 1620, the method may include receiving a second reference signal from the first wireless device in accordance with the secret key derivation process. The operations of 1620 may be performed in accordance with examples as disclosed herein. In some examples, aspects of the operations of 1620 may be performed by a reference signal receiver 635 as described with reference to FIG. 6.

At 1625, the method may include estimating a communications channel between the UE and the first wireless device based on the second reference signal and in accordance with the secret key derivation process. The operations of 1625 may be performed in accordance with examples as disclosed herein. In some examples, aspects of the operations of 1625 may be performed by a channel estimation component 640 as described with reference to FIG. 6.

At 1630, the method may include determining the secret key based on the communications channel estimated by the UE in accordance with the secret key derivation process. The operations of 1630 may be performed in accordance with examples as disclosed herein. In some examples, aspects of the operations of 1630 may be performed by a secret key derivation component 645 as described with reference to FIG. 6.

At 1635, the method may include communicating with a selected wireless device over the communications channel using wireless communications that are secured using the secret key. The operations of 1635 may be performed in accordance with examples as disclosed herein. In some examples, aspects of the operations of 1635 may be performed by a secure communications manager 650 as described with reference to FIG. 6.

Figure 17:
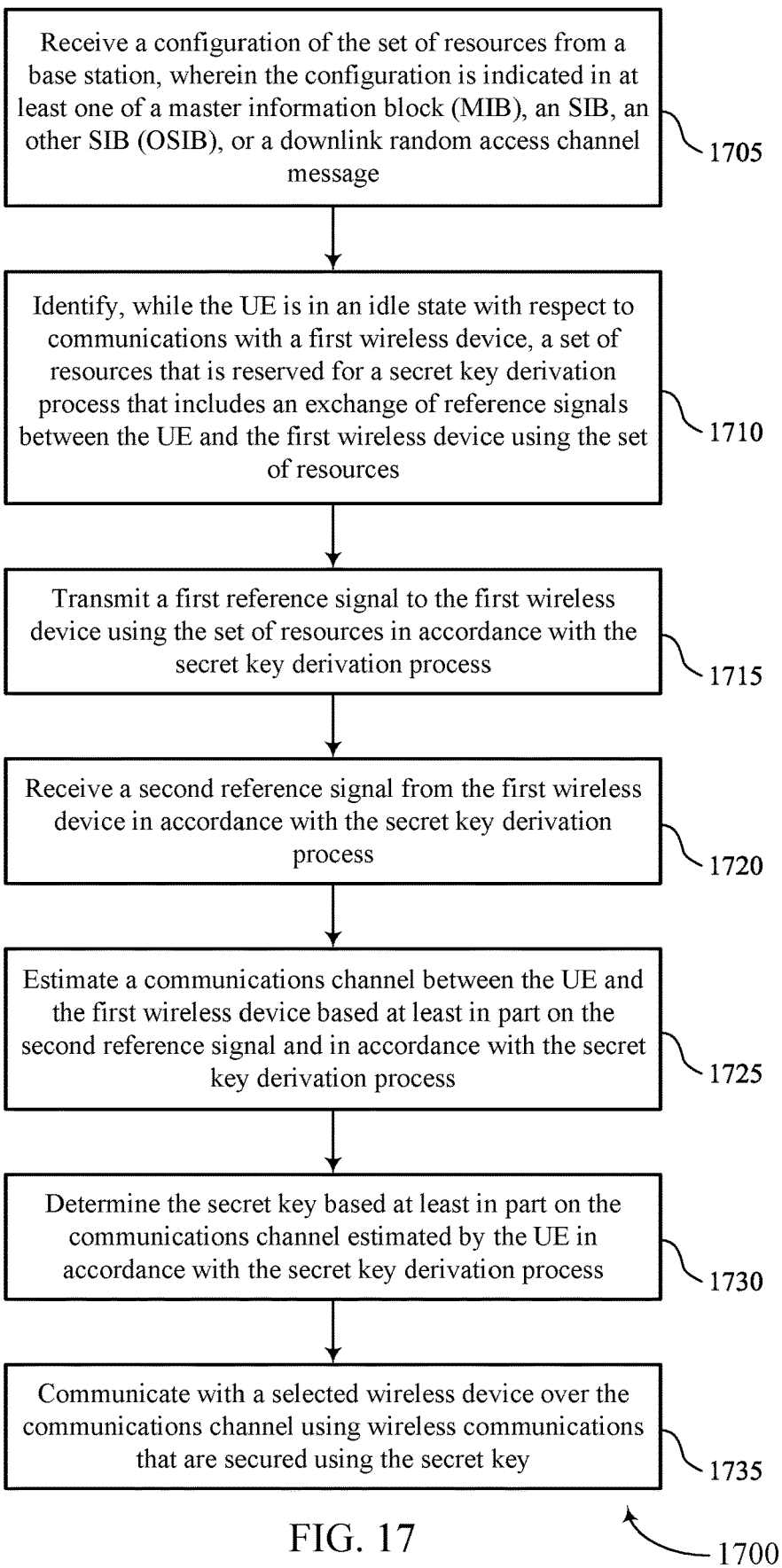

FIG. 17 shows a flowchart illustrating a method 1700 that supports preconfigured reference signal resources for secret key extraction in accordance with aspects of the present disclosure. The operations of the method 1700 may be implemented by a UE or its components as described herein. For example, the operations of the method 1700 may be performed by a UE 115 as described with reference to FIGS. 1 through 7. In some examples, a UE may execute a set of instructions to control the functional elements of the UE to perform the described functions. Additionally or alterna- At 1705, the method may include receiving a configuration of the set of resources from a base station, where the configuration is indicated in at least one of a MIB, an SIB, an OSIB, or a downlink RACH message. The operations of 1705 may be performed in accordance with examples as disclosed herein. In some examples, aspects of the operations of 1705 may be performed by a resource indication receiver 660 as described with reference to FIG. 6.

At 1710, the method may include identifying, while the UE is in an idle state with respect to communications with a first wireless device, a set of resources that is reserved for a secret key derivation process that includes an exchange of reference signals between the UE and the first wireless device using the set of resources. The operations of 1710 may be performed in accordance with examples as disclosed herein. In some examples, aspects of the operations of 1710 may be performed by a resource identification component 625 as described with reference to FIG. 6.

At 1715, the method may include transmitting a first reference signal to the first wireless device using the set of resources in accordance with the secret key derivation process. The operations of 1715 may be performed in accordance with examples as disclosed herein. In some examples, aspects of the operations of 1715 may be performed by a reference signal transmitter 630 as described with reference to FIG. 6.

At 1720, the method may include receiving a second reference signal from the first wireless device in accordance with the secret key derivation process. The operations of 1720 may be performed in accordance with examples as disclosed herein. In some examples, aspects of the operations of 1720 may be performed by a reference signal receiver 635 as described with reference to FIG. 6.

At 1725, the method may include estimating a communications channel between the UE and the first wireless device based on the second reference signal and in accordance with the secret key derivation process. The operations of 1725 may be performed in accordance with examples as disclosed herein. In some examples, aspects of the operations of 1725 may be performed by a channel estimation component 640 as described with reference to FIG. 6.

At 1730, the method may include determining the secret key based on the communications channel estimated by the UE in accordance with the secret key derivation process. The operations of 1730 may be performed in accordance with examples as disclosed herein. In some examples, aspects of the operations of 1730 may be performed by a secret key derivation component 645 as described with reference to FIG. 6.

At 1735, the method may include communicating with a selected wireless device over the communications channel using wireless communications that are secured using the secret key. The operations of 1735 may be performed in accordance with examples as disclosed herein. In some examples, aspects of the operations of 1735 may be performed by a secure communications manager 650 as described with reference to FIG. 6.

Figure 18:
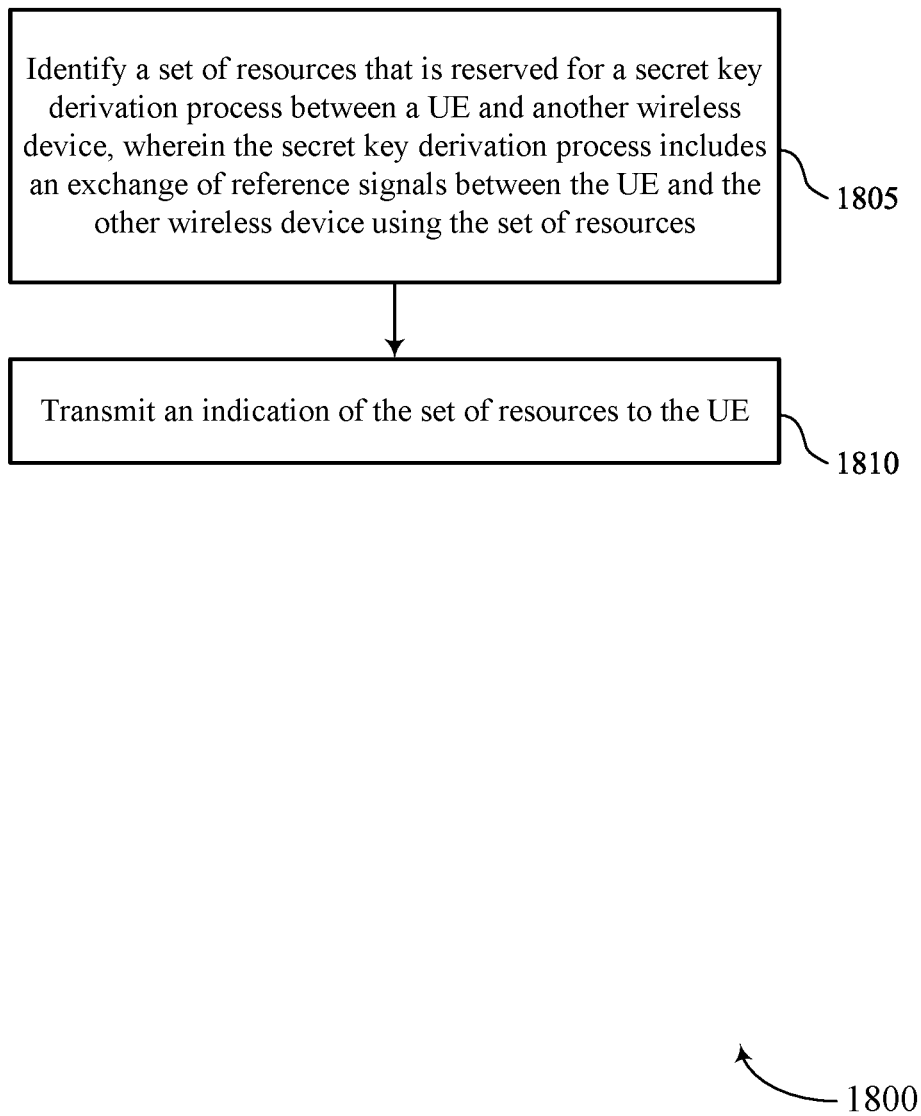

FIG. 18 shows a flowchart illustrating a method 1800 that supports preconfigured reference signal resources for secret key extraction in accordance with aspects of the present disclosure. The operations of the method 1800 may be implemented by a base station or its components as described herein. For example, the operations of the method 1800 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1805, the method may include identifying a set of resources that is reserved for a secret key derivation process between a UE and another wireless device, where the secret key derivation process includes an exchange of reference signals between the UE and the other wireless device using the set of resources. The operations of 1805 may be performed in accordance with examples as disclosed herein. In some examples, aspects of the operations of 1805 may be performed by a resource identification component 1025 as described with reference to FIG. 10.

At 1810, the method may include transmitting an indication of the set of resources to the UE. The operations of 1810 may be performed in accordance with examples as disclosed herein. In some examples, aspects of the operations of 1810 may be performed by a resource indication transmitter 1030 as described with reference to FIG. 10.

The following provides an overview of aspects of the present disclosure:

Aspect 1: A method for wireless communications at a UE, comprising: identifying, while the UE is in an idle state with respect to communications with a first wireless device, a set of resources that is reserved for a secret key derivation process that includes an exchange of reference signals between the UE and the first wireless device using the set of resources; transmitting a first reference signal to the first wireless device using the set of resources in accordance with the secret key derivation process; receiving a second reference signal from the first wireless device in accordance with the secret key derivation process; estimating a communications channel between the UE and the first wireless device based at least in part on the second reference signal and in accordance with the secret key derivation process; determining the secret key based at least in part on the communications channel estimated by the UE in accordance with the secret key derivation process; and communicating with a selected wireless device over the communications channel using wireless communications that are secured using the secret key.

Aspect 2: The method of aspect 1, wherein identifying the set of resources further comprises: identifying the set of resources as a periodic set of resources available for use by a plurality of wireless devices that includes the UE.

Aspect 3: The method of any of aspects 1 through 2, wherein identifying the set of resources further comprises: identifying the set of resources as individual wideband sidelink reference signal resources per sidelink resource pool, wherein the UE is a first sidelink device and the first wireless device is a second sidelink device that is one of a relay UE, a primary UE, or an PLC UE.

Aspect 4: The method of any of aspects 1 through 3, wherein identifying the set of resources further comprises: reserving the set of resources during one or more sidelink channel reservation occasions, wherein the one or more sidelink channel reservation occasions are available for a plurality of wireless devices to compete for access to the set of resources.

Aspect 5: The method of aspect 4, further comprising: obtaining access to the one or more channel reservation occasions, wherein obtaining access to the one or more channel reservation occasions is based at least in part on a data priority, data security requirements, or both, associated with the UE.

Aspect 6: The method of any of aspects 1 through 5, wherein identifying the set of resources further comprises: selecting the set of resources based at least in part on a synchronization signal block (SSB) index used by the UE to communicate with a base station.

Aspect 7: The method of aspect 6, wherein the first reference signal is quasi co-located with an SSB associated with the SSB index.

Aspect 8: The method of any of aspects 1 through 7, wherein identifying the set of resources further comprises: selecting the set of resources based at least in part on a random access occasion and preamble index used by the UE to communicate with a base station.

Aspect 9: The method of any of aspects 1 through 8, wherein identifying the set of resources further comprises: receiving an index of the set of resources from a base station, wherein the index is included in at least one of a master information block (MIB), an SIB, an other SIB (OSIB), or a downlink random access channel message.

Aspect 10: The method of any of aspects 1 through 9, wherein identifying the set of resources further comprises: receiving an index of the set of resources, wherein the index is included in a physical broadcast channel.

Aspect 11: The method of any of aspects 1 through 10, wherein identifying the set of resources further comprises: receiving a configuration of the set of resources from a base station, wherein the configuration is indicated in at least one of a master information block (MIB), an SIB, an other SIB (OSIB), or a downlink random access channel message.

Aspect 12: The method of any of aspects 1 through 11, wherein identifying the set of resources further comprises: receiving, via a master information block (MIB), a configuration of the set of resources such that the wireless communications that are secured using the secret key include receipt of an SIB and exchange of one or more random access channel messages.

Aspect 13: The method of any of aspects 1 through 12, wherein identifying the set of resources further comprises: receiving, via an SIB, a configuration of the set of resources such that the wireless communications that are secured using the secret key include exchange of one or more random access channel messages.

Aspect 14: The method of any of aspects 1 through 13, wherein identifying the set of resources further comprises: receiving, via an other system information block (OSIB), a configuration of the set of resources such that the wireless communications that are secured using the secret key include exchange of one or more random access channel messages.

Aspect 15: The method of any of aspects 1 through 14, wherein identifying the set of resources further comprises: receiving, via a downlink random access channel message, a configuration of the set of resources such that the wireless communications that are secured using the secret key include receipt exchange of additional random access channel messages subsequent to the downlink random access channel message.

Aspect 16: The method of any of aspects 1 through 15, wherein the first reference signal is an SRS or a sidelink reference signal (SL-RS) while the second reference signal is a channel state information reference signal (CSI-RS) or SL-RS.

Aspect 17: The method of any of aspects 1 through 16, wherein the selected wireless device is either the first wireless device or another wireless device.

Aspect 18: A method for wireless communications at a base station, comprising: identifying a set of resources that is reserved for a secret key derivation process between a UE and another wireless device, wherein the secret key derivation process includes an exchange of reference signals between the UE and the other wireless device using the set of resources; transmitting an indication of the set of resources to the UE.

Aspect 19: The method of aspect 18, wherein transmitting the indication of the set of resources to the UE further comprises: transmitting an index of the set of resources, wherein the index is included in at least one of a master information block (MIB), an SIB, an other SIB (OSIB), or a downlink random access channel message.

Aspect 20: The method of any of aspects 18 through 19, wherein transmitting the indication of the set of resources to the UE further comprises: transmitting an index of the set of resources, wherein the index is included in a physical broadcast channel.

Aspect 21: The method of any of aspects 18 through 20, wherein transmitting the indication of the set of resources to the UE further comprises: transmitting a configuration of the set of resources, wherein the configuration is indicated in at least one of a master information block (MIB), an SIB, an other SIB (OSIB), or a downlink random access channel message.

Aspect 22: The method of any of aspects 18 through 21, wherein transmitting the indication of the set of resources to the UE further comprises: transmitting, via a master information block (MIB), a configuration of the set of resources such that the wireless communications that are secured using the secret key include receipt of an SIB and exchange of one or more random access channel messages.

Aspect 23: The method of any of aspects 18 through 22, wherein transmitting the indication of the set of resources to the UE further comprises: transmitting, via an SIB, a configuration of the set of resources such that the wireless communications that are secured using the secret key include exchange of one or more random access channel messages.

Aspect 24: The method of any of aspects 18 through 23, wherein transmitting the indication of the set of resources to the UE further comprises: transmitting, via an other system information block (OSIB), a configuration of the set of resources such that the wireless communications that are secured using the secret key include exchange of one or more random access channel messages.

Aspect 25: The method of any of aspects 18 through 24, wherein identifying the set of resources further comprises: transmitting, via a downlink random access channel message, a configuration of the set of resources such that the wireless communications that are secured using the secret key include receipt exchange of additional random access channel messages subsequent to the downlink random access channel message.

Aspect 26: An apparatus for wireless communications at a UE, comprising a processor; memory coupled with the processor; and instructions stored in the memory and executable by the processor to cause the apparatus to perform a method of any of aspects 1 through 17.

Aspect 27: An apparatus for wireless communications at a UE, comprising at least one means for performing a method of any of aspects 1 through 17.

Aspect 28: A non-transitory computer-readable medium storing code for wireless communications at a UE, the code comprising instructions executable by a processor to perform a method of any of aspects 1 through 17.

Aspect 29: An apparatus for wireless communications at a base station, comprising a processor; memory coupled with the processor; and instructions stored in the memory and executable by the processor to cause the apparatus to perform a method of any of aspects 18 through 25.

Aspect 30: An apparatus for wireless communications at a base station, comprising at least one means for performing a method of any of aspects 18 through 25.

Aspect 31: A non-transitory computer-readable medium storing code for wireless communications at a base station, the code comprising instructions executable by a processor to perform a method of any of aspects 18 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    identifying, while the UE is in an idle state with respect to communications with a first wireless device, a set of resources that is reserved for a secret key derivation process that includes an exchange of reference signals between the UE and the first wireless device using the set of resources;
    transmitting a first reference signal to the first wireless device using the set of resources in accordance with the secret key derivation process;
    receiving a second reference signal from the first wireless device in accordance with the secret key derivation process;
    estimating a communications channel between the UE and the first wireless device based at least in part on the second reference signal and in accordance with the secret key derivation process;
    determining a secret key based at least in part on the communications channel estimated by the UE in accordance with the secret key derivation process; and
    communicating with a selected wireless device over the communications channel using wireless communications that are secured using the secret key.

2. The method of claim 1, wherein identifying the set of resources further comprises:
    identifying the set of resources as a periodic set of resources available for use by a plurality of wireless devices that includes the UE.

3. The method of claim 1, wherein identifying the set of resources further comprises:
    identifying the set of resources as individual wideband sidelink reference signal resources per sidelink resource pool, wherein the UE is a first sidelink device and the first wireless device is a second sidelink device that is one of a relay UE, a primary UE, or a programmable logic controller (PLC) UE.

4. The method of claim 1, wherein identifying the set of resources further comprises:
    reserving the set of resources during one or more sidelink channel reservation occasions, wherein the one or more sidelink channel reservation occasions are available for a plurality of wireless devices to compete for access to the set of resources.

5. The method of claim 4, further comprising:
    obtaining access to the one or more sidelink channel reservation occasions, wherein obtaining access to the one or more sidelink channel reservation occasions is based at least in part on a data priority, data security requirements, or both, associated with the UE.

6. The method of claim 1, wherein identifying the set of resources further comprises:
    selecting the set of resources based at least in part on a synchronization signal block (SSB) index used by the UE to communicate with a base station.

7. The method of claim 6, wherein the first reference signal is quasi co-located with an SSB associated with the SSB index.

8. The method of claim 1, wherein identifying the set of resources further comprises:
    selecting the set of resources based at least in part on a random access occasion and preamble index used by the UE to communicate with a base station.

9. The method of claim 1, wherein identifying the set of resources further comprises:
    receiving an index of the set of resources from a base station, wherein the index is included in at least one of a master information block (MIB), a system information block (SIB), an other SIB (OSIB), or a downlink random access channel message.

10. The method of claim 1, wherein identifying the set of resources further comprises:
    receiving an index of the set of resources, wherein the index is included in a physical broadcast channel.

11. The method of claim 1, wherein identifying the set of resources further comprises:
    receiving a configuration of the set of resources from a base station, wherein the configuration is indicated in at least one of a master information block (MIB), a system information block (SIB), an other SIB (OSIB), or a downlink random access channel message.

12. The method of claim 1, wherein identifying the set of resources further comprises:
    receiving, via a master information block (MIB), a configuration of the set of resources such that the wireless communications that are secured using the secret key include receipt of a system information block (SIB) and exchange of one or more random access channel messages.

13. The method of claim 1, wherein identifying the set of resources further comprises:
    receiving, via a system information block (SIB), a configuration of the set of resources such that the wireless communications that are secured using the secret key include exchange of one or more random access channel messages.

14. The method of claim 1, wherein identifying the set of resources further comprises:
    receiving, via an other system information block (OSIB), a configuration of the set of resources such that the wireless communications that are secured using the secret key include exchange of one or more random access channel messages.

15. The method of claim 1, wherein identifying the set of resources further comprises:
    receiving, via a downlink random access channel message, a configuration of the set of resources such that the wireless communications that are secured using the secret key include receipt exchange of additional random access channel messages subsequent to the downlink random access channel message.

16. The method of claim 1, wherein the first reference signal is a sounding reference signal (SRS) or a sidelink reference signal (SL-RS) while the second reference signal is a channel state information reference signal (CSI-RS) or SL-RS.

17. The method of claim 1, wherein the selected wireless device is either the first wireless device or another wireless device.

18. A user equipment (UE) for wireless communications, comprising:
  one or more memories storing processor-executable code; and
  one or more processors coupled with the one or more memories and operable to execute the code to cause the UE to:
    identify, while the UE is in an idle state with respect to communications with a first wireless device, a set of resources that is reserved for a secret key derivation process that includes an exchange of reference signals between the UE and the first wireless device using the set of resources;
    transmit a first reference signal to the first wireless device using the set of resources in accordance with the secret key derivation process;
    receive a second reference signal from the first wireless device in accordance with the secret key derivation process;
    estimate a communications channel between the UE and the first wireless device based at least in part on the second reference signal and in accordance with the secret key derivation process;
    determine a secret key based at least in part on the communications channel estimated by the UE in accordance with the secret key derivation process; and
    communicate with a selected wireless device over the communications channel using wireless communications that are secured using the secret key.

19. The UE of claim 18, wherein, to identify the set of resources, the one or more processors are operable to execute the code to cause the UE to:
  identify the set of resources as a periodic set of resources available for use by a plurality of wireless devices that includes the UE.

20. The UE of claim 18, wherein, to identify the set of resources, the one or more processors are operable to execute the code to cause the UE to:
  identify the set of resources as individual wideband sidelink reference signal resources per sidelink resource pool, wherein the UE is a first sidelink device and the first wireless device is a second sidelink device that is one of a relay UE, a primary UE, or a programmable logic controller (PLC) UE.

21. The UE of claim 18, wherein, to identify the set of resources, the one or more processors are operable to execute the code to cause the UE to:
  receive an index of the set of resources from a base station, wherein the index is included in at least one of a master information block (MIB), a system information block (SIB), an other SIB (OSIB), or a downlink random access channel message.

* * * * *